United States Patent
Nakano et al.

[11] Patent Number: 5,901,366
[45] Date of Patent: May 4, 1999

[54] PROGRAM SELECTION METHOD AND APPARATUS USING CORDLESS TELEPHONE SET

[75] Inventors: Hiroaki Nakano; Makoto Niijima; Yumie Sonoda; Junichi Nagahara; Hirofumi Tamori, all of Tokyo, Japan

[73] Assignee: Sony Corporation, Tokyo, Japan

[21] Appl. No.: 08/640,079

[22] Filed: Apr. 30, 1996

[30] Foreign Application Priority Data

May 2, 1995 [JP] Japan .................................. 7-108472

[51] Int. Cl.⁶ .............................. H04B 1/38; H04M 3/00; H04M 1/00; H04M 5/44
[52] U.S. Cl. .......................... 455/575; 455/420; 455/462; 379/110.01; 348/734; 348/565
[58] Field of Search .............................. 455/90, 550, 403, 455/560, 575, 344, 420; 379/110.01; 348/734, 6, 7, 12, 13, 10, 563–565

[56] References Cited

U.S. PATENT DOCUMENTS

| | | | |
|---|---|---|---|
| 4,338,492 | 7/1982 | Snopko .............................. | 379/110.01 |
| 4,356,509 | 10/1982 | Skerlos et al. ..................... | 379/110.01 |
| 4,392,022 | 7/1983 | Carlson .............................. | 379/110.01 |
| 4,427,847 | 1/1984 | Hofmann et al. .................. | 379/110.01 |
| 4,456,925 | 6/1984 | Skerlos et al. ..................... | 379/110.01 |
| 4,508,935 | 4/1985 | Mastromoro ....................... | 455/462 |
| 4,746,983 | 5/1988 | Hakamada ........................ | 358/183 |
| 4,777,531 | 10/1988 | Hakamada et al. ............... | 358/183 |
| 4,965,557 | 10/1990 | Schepers et al. ................. | 340/711 |
| 5,138,649 | 8/1992 | Krisbergh et al. ................ | 455/575 |
| 5,537,152 | 7/1996 | Ishikawa .......................... | 348/734 |
| 5,594,509 | 1/1997 | Florin et al. ..................... | 348/734 |
| 5,598,523 | 1/1997 | Fujita ................................ | 348/734 |
| 5,671,267 | 9/1997 | August et al. .................... | 455/566 |

FOREIGN PATENT DOCUMENTS

| | | | |
|---|---|---|---|
| 0390041A2 | 10/1990 | European Pat. Off. .......... | H04B 1/20 |
| 0557033A2 | 8/1993 | European Pat. Off. ......... | H04N 5/45 |
| 0617556A1 | 9/1994 | European Pat. Off. ....... | H04N 5/445 |
| 0626773A1 | 11/1994 | European Pat. Off. ......... | H04M 1/72 |
| 2092347 | 8/1982 | United Kingdom ............ | H03J 9/00 |
| 2227901 | 8/1990 | United Kingdom ............ | H04N 5/45 |

*Primary Examiner*—Dwayne D. Bost
*Assistant Examiner*—Tracy M. Legree
*Attorney, Agent, or Firm*—Jay H. Maioli

[57] ABSTRACT

The invention provides a program selection method and apparatus using a cordless telephone set by which a desired program can be selected from among a large number of programs in a direct rapid and accurate manner. A TEL key changes over a mode of a cordless telephone set between a first mode in which the cordless telephone set is used as a telephone set and a second mode in which the cordless telephone set is used as a remote commander for remotely controlling an electronic apparatus. A monitor apparatus displays a first display corresponding to a function allocated to any of the keys of the cordless telephone set in the first mode and a second display different from the first display and corresponding to another function allocated to any of the keys in the second mode for remotely controlling the electronic apparatus. A transmission circuit generates a signal corresponding to the manually operated key in response to a manual operation of any of the keys.

5 Claims, 20 Drawing Sheets

FIG. IA

ORDINARY SCREEN (= SCREEN OF PROGRAM)

FIG. IB (240×160 PICTURE ELEMENTS)×9

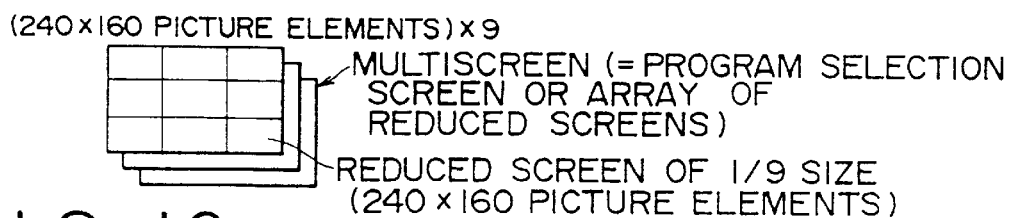

MULTISCREEN (= PROGRAM SELECTION SCREEN OR ARRAY OF REDUCED SCREENS)

REDUCED SCREEN OF 1/9 SIZE (240×160 PICTURE ELEMENTS)

FIG. IC (240×160 PICTURE ELEMENTS)×9×6

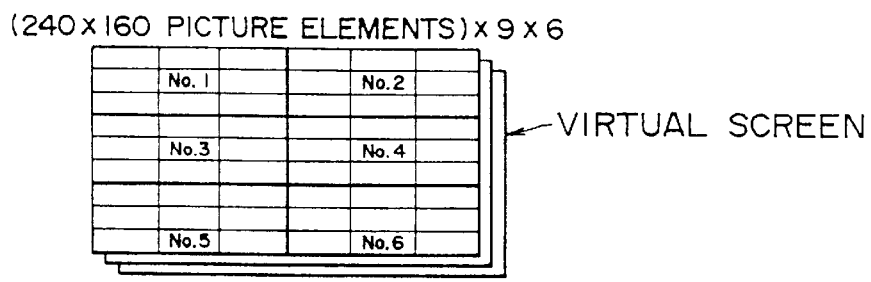

VIRTUAL SCREEN

FIG. ID

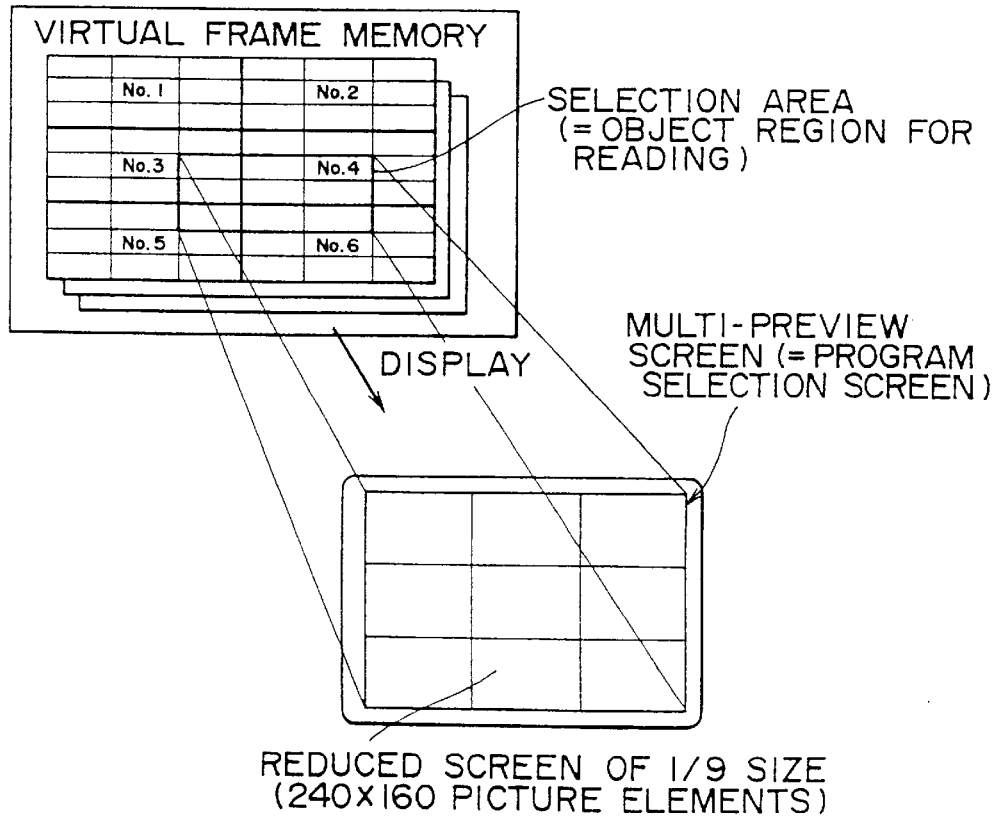

SELECTION AREA (= OBJECT REGION FOR READING)

DISPLAY

MULTI-PREVIEW SCREEN (= PROGRAM SELECTION SCREEN)

REDUCED SCREEN OF 1/9 SIZE (240×160 PICTURE ELEMENTS)

F I G. 3
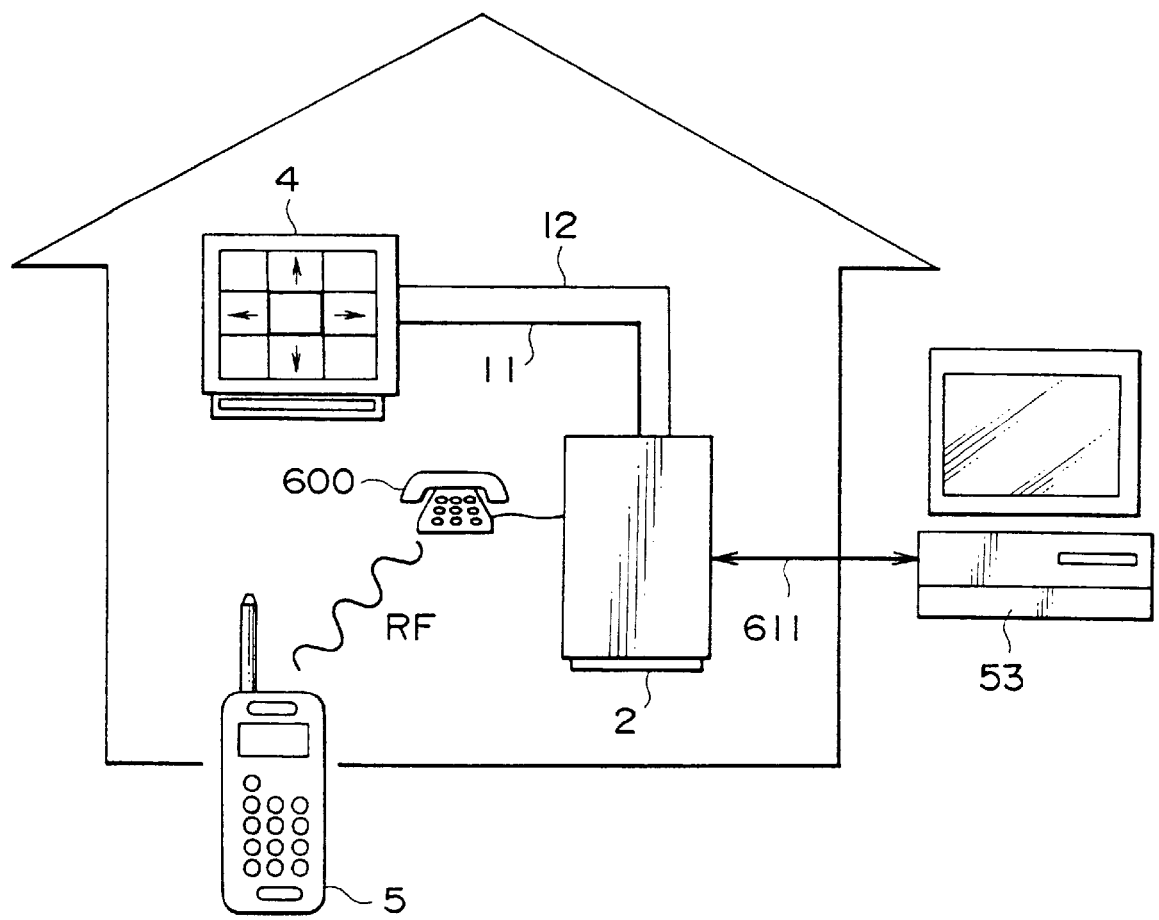

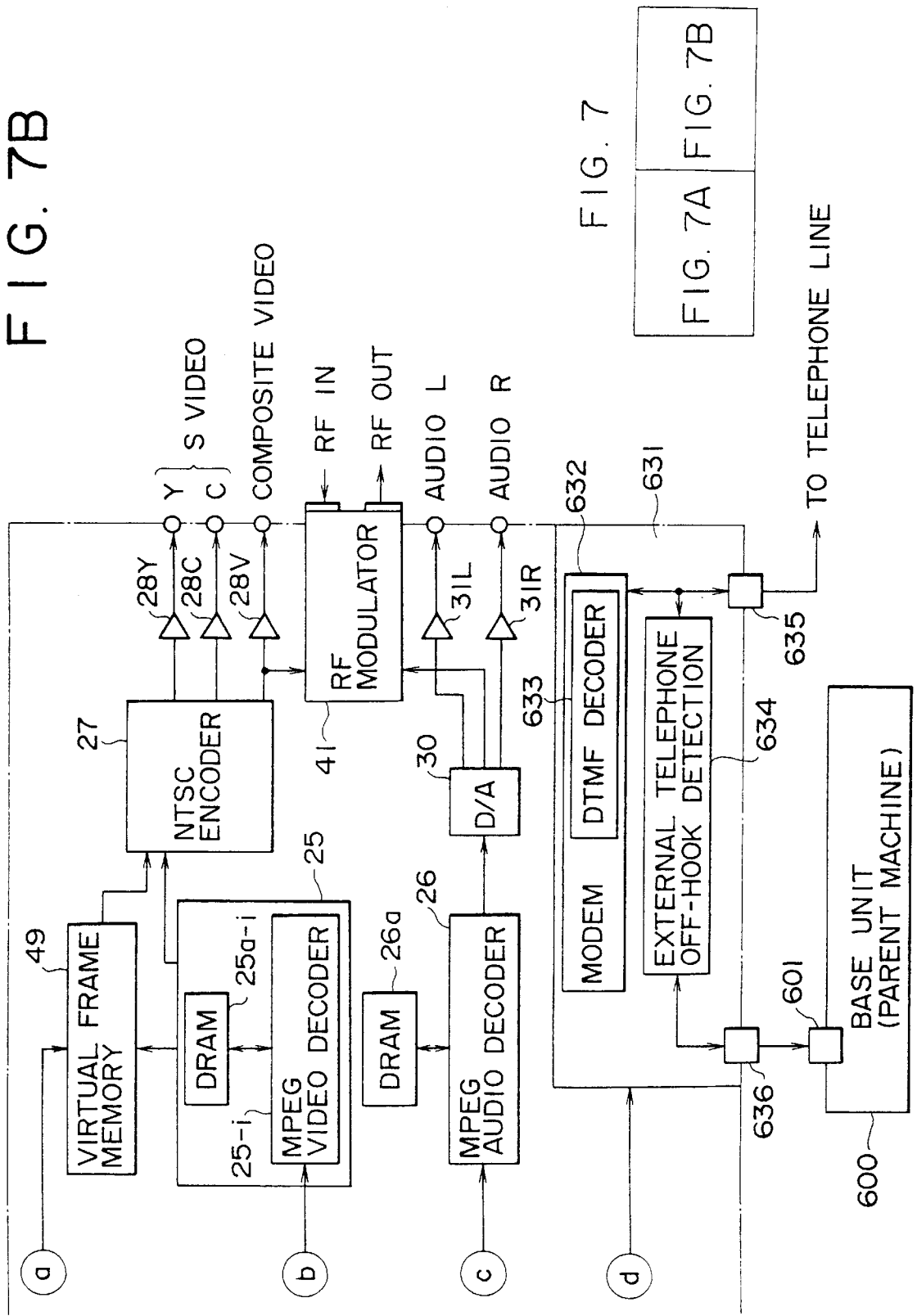

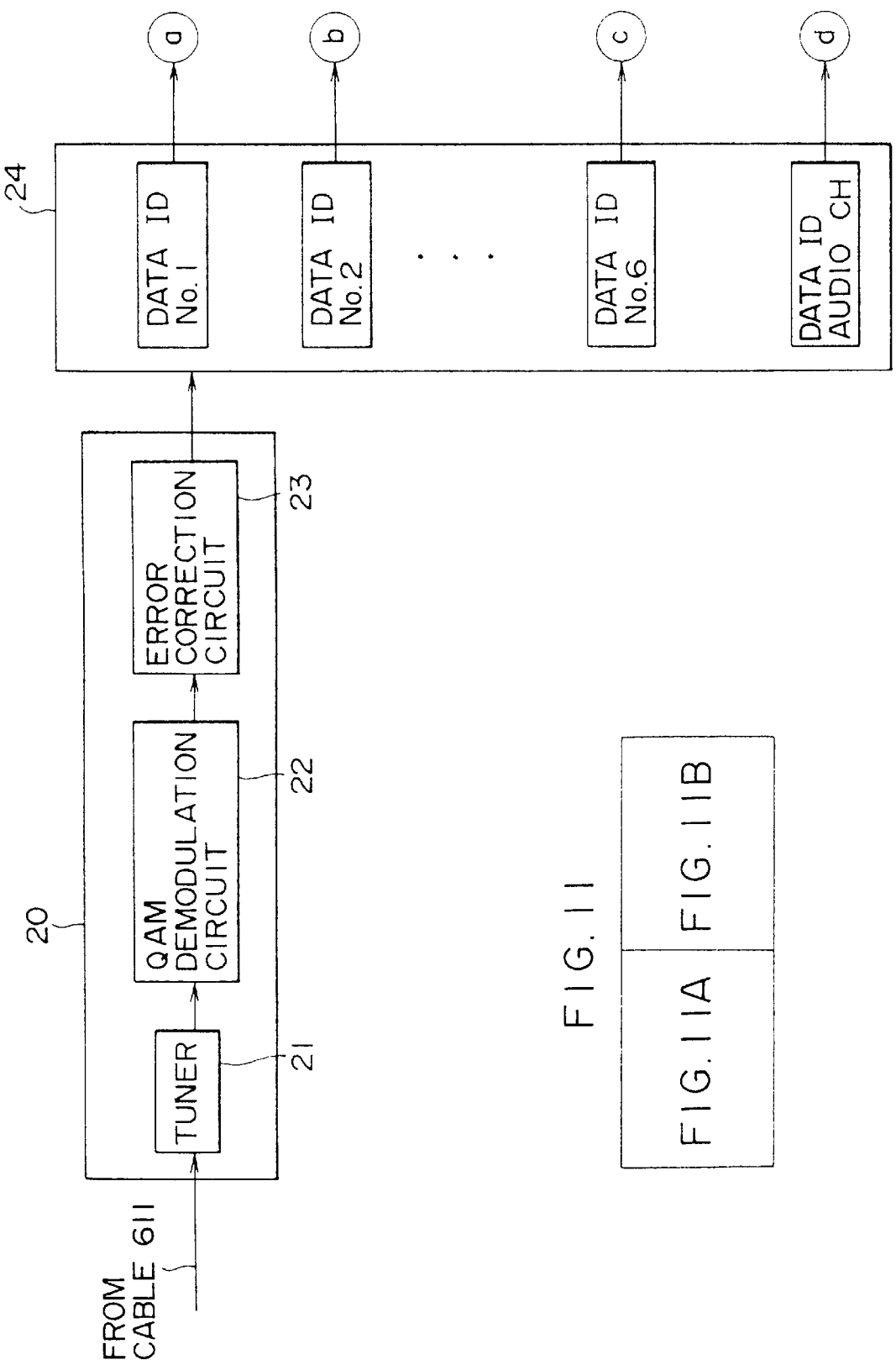

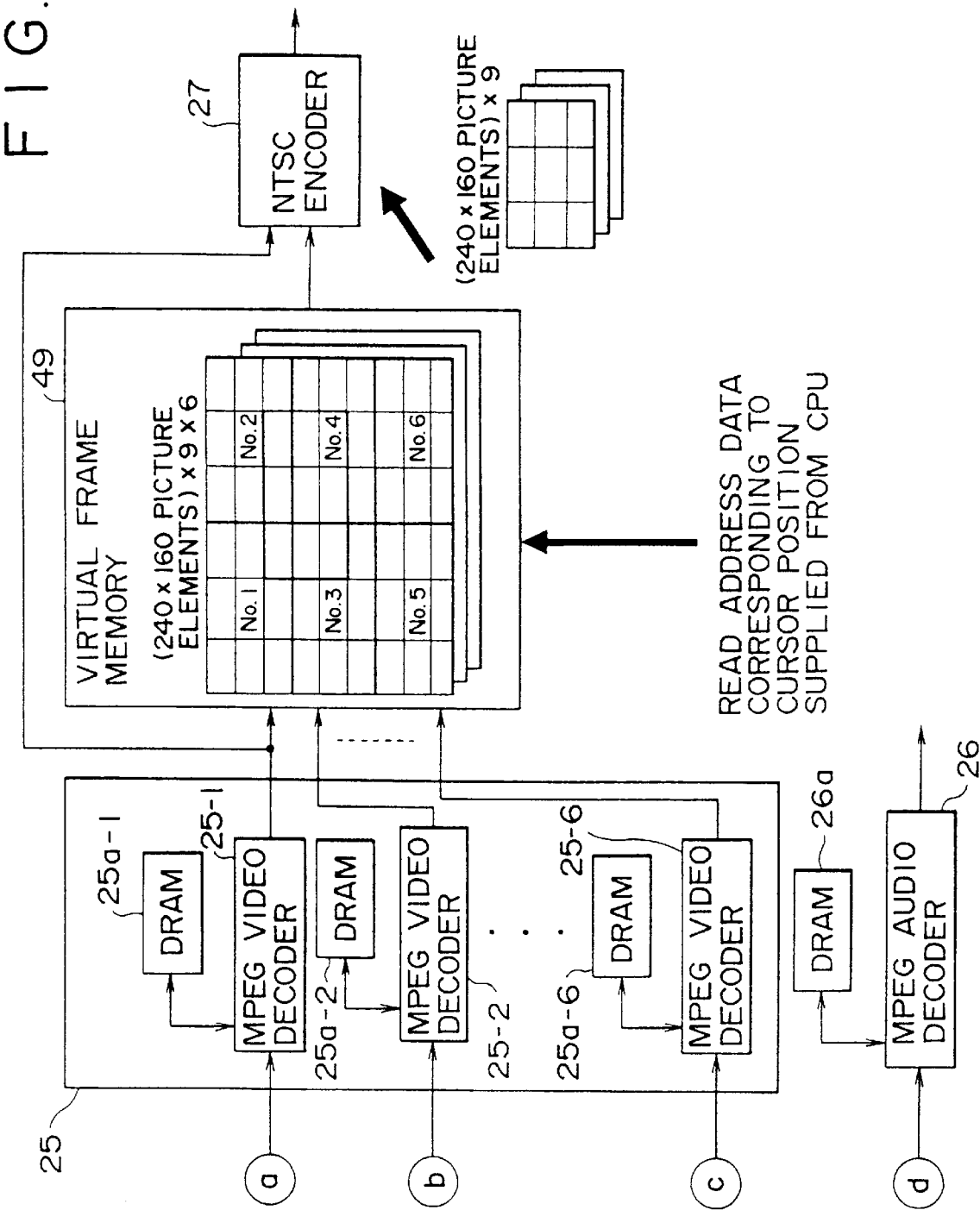
FIG. IIB

PROGRAM SELECTION METHOD AND APPARATUS USING CORDLESS TELEPHONE SET

BACKGROUND OF THE INVENTION

This invention relates to a program selection method and apparatus using a cordless telephone set, and more particularly to a program selection method and apparatus wherein a remote commander and a cordless telephone set are formed as a unitary member so as to allow selection of a program.

In recent years, electronic apparatus such as a television receiver, a video cassette recorder (VCR), a video disk player and a compact disk player have propagated, and those electronic apparatus are constructed so that they can be remotely controlled by respective remote commanders for exclusive use. As a result, the number of kinds of remote commanders has so increased that, in order to control each electronic apparatus, it is necessary to search a corresponding remote commander first and then search and manually operate a button corresponding to a predetermined function of the remote commander, -and thus there is a problem to be solved in that the operability is low.

Thus, a related art apparatus wherein a function of a remote commander is added to a cordless telephone set is disclosed in, for example, Japanese Patent Laid-open No Hei 2-31545. According to the related art apparatus, since an electronic apparatus can be controlled using a cordless telephone set, the number of remote commanders in a home can be reduced.

How ever, in the related art disclosed in Japanese Patent Laid-open No. Hei 2-31545 mentioned above, in order to select a predetermined program broadcast, for example, by television broadcasting, numeric keys provided on a cordless telephone set are manually operated to merely input a channel number, and there is a problem to be solved in that it is difficult to select a desired program from among a large number of programs rapidly and with certainty.

For example, in the United States of America, the number of broadcasting channels has increased in a cable television (CATV) system or a digital direct satellite broadcasting system (DSS: Digital Satellite System, a trademark of Hughes Communications) applying a high efficiency coding technique such as the MPEG (Moving Picture Experts Group). As a result of an increase in number of channels, the number of broadcasting channels have increased to 150 to 200.

Also in Japan, a digital television broadcast is being planned. If a digital television broadcast becomes available, then a very large number of television programs can be broadcast.

Where a program is selected from among such a large number of programs by inputting a numeral representing a broadcasting channel of the program, it is difficult to select a desired program rapidly with certainty, intuitively and directly.

SUMMARY OF THE INVENTION

It is an object of the present invention to provide a program selection method and apparatus using a cordless telephone set by which a desired program can be selected from among a large number of programs rapidly with certainty, intuitively and directly.

In order to attain the object described above, according to an aspect of the present invention, there is provided a program selection apparatus using a cordless telephone set which includes a plurality of keys corresponding to numerals for being manually operated to input a telephone number, comprising a change-over means for changing over a mode of the cordless telephone set between a mode in which the cordless telephone set is used as a telephone set and another mode in which the cordless telephone set is used as a remote commander for remotely controlling an electronic apparatus, a display means for displaying a first display corresponding to a function allocated to any of the keys when the cordless telephone set is used as a telephone set and a second display different from the first display and corresponding to another function allocated to any of the keys when the cordless telephone set is used as a remote commander for remotely controlling the electronic apparatus, and a generation means responsive to a manual operation of any of the keys for generating a signal corresponding to the manually operated key.

In the program selection apparatus, the change-over means changes over the mode of the cordless telephone set between a mode in which the cordless telephone set is used as a telephone set and another mode in which the cordless telephone set is used as a remote commander for remotely controlling the electronic apparatus, and the display means displays a first display corresponding to a function allocated to any of the keys when the cordless telephone set is used as a telephone set and displays a second display different from the first display and corresponding to another function allocated to any of the keys when the cordless telephone set is used as a remote commander for remotely controlling the electronic apparatus.

Accordingly, with the program selection apparatus, the first display when the cordless telephone set is used as a telephone set or the second display when the cordless telephone set is used as a remote commander for remotely controlling the electronic apparatus is selectively displayed, and consequently, the cordless telephone set can be used not only as a telephone set but also as a remote commander. Further, the program selection apparatus can cause the cordless telephone set to perform not only a function similar to an allocation function of a telephone set but also another function quite different from the allocation function of a telephone set intuitively and directly.

According to another aspect of the present invention, there is provided an electronic apparatus to which a program selection apparatus using a cordless telephone set is applied, comprising a reception means for receiving a signal from the cordless telephone set, a control means for performing a line controlling operation when a first DTMF signal from the cordless telephone set is received by the reception means in a first mode of the electronic apparatus, and an output means for outputting a signal of a program selection screen in which reduced screens obtained by reducing screens of a plurality of programs are arranged when a second DTMF signal from the cordless telephone set is received by the reception means in a second mode of the electronic apparatus.

In the electronic apparatus, the control means performs a line controlling operation when a first DTMF signal from the cordless telephone set is received by the reception means in a first mode of the electronic apparatus, and the output means outputs a signal of a program selection screen in which reduced screens obtained by reducing screens of a plurality of programs are arranged when a second DTMF signal from the cordless telephone set is received by the reception means in a second mode of the electronic apparatus.

With the electronic apparatus, when a second DTMF signal from the cordless telephone set is received in a second mode of the electronic apparatus, a signal of a program selection screen in which reduced screens obtained by reducing screens of a plurality of programs are arranged is outputted. Consequently, a program selection screen can be outputted intuitively, directly and rapidly using the cordless telephone set.

According to a further aspect of the present invention, there is provided an electronic apparatus to which a program selection apparatus using a cordless telephone set is applied, comprising an output means for outputting a signal of a program selection screen in which reduced screens obtained by reducing screens of a plurality of programs are arranged, a reception means for receiving a signal from the cordless telephone set, a control means for performing a line controlling operation when a first DTMF signal from the cordless telephone set is received by the reception means in a first mode of the electronic apparatus, and a movement means for moving a cursor arranged on the program selection screen when a second DTMF signal from the cordless telephone set is received by the reception means in a second mode of the electronic apparatus.

In the electronic apparatus, the control means performs a line controlling operation when a first DTMF signal from the cordless telephone set is received by the reception means in a first mode of the electronic apparatus, and the movement means moves the cursor arranged on the program selection screen when a second DTMF signal from the cordless telephone set is received by the reception means in a second mode of the electronic apparatus.

With the electronic apparatus, the cursor is moved when a second DTMF signal from the cordless telephone set is received in a second mode of the electronic apparatus. Consequently, a desired program can be selected from within a program selection screen rapidly with certainty as well as intuitively and directly using the cordless telephone set.

According to a still further aspect of the present invention, there is provided a program selection method using a cordless telephone set, comprising the steps of receiving a signal from the cordless telephone set, performing a line controlling operation when a first DTMF signal is received from the cordless telephone set in a first mode, and outputting a signal of a program selection screen in which reduced screens obtained by reducing screens of a plurality of programs are arranged when a second DTMF signal from the cordless telephone set is received in a second mode.

In the program selection method, when a first DTMF signal is received from the cordless telephone set in a first mode, a line controlling operation is performed, but when a second DTMF signal from the cordless telephone set is received in a second mode, a signal of a program selection screen in which reduced screens obtained by reducing screens of a plurality of programs are arranged is outputted.

With the program selection method, when a second DTMF signal from the cordless telephone set is received in a second mode, a signal of a program selection screen in which reduced screens obtained by reducing screens of a plurality of programs are arranged is outputted. Consequently, a program selection screen can be outputted intuitively, directly and rapidly using the cordless telephone set.

According to a yet further aspect of the present invention, there is provided a program selection method using a cordless telephone set, comprising the steps of arranging a cursor at a position of one of the child screens of a program selection screen in which reduced screens obtained by reducing screens of a plurality of programs are arranged, receiving a signal from the cordless telephone set, performing a line controlling operation when a first DTMF signal is received from the cordless telephone set in a first mode, and moving the cursor when a second DTMF signal is received from the cordless telephone set in a second mode.

In the program selection method, when a first DTMF signal is received from the cordless telephone set in a first mode, a line controlling operation is performed, but when a second DTMF signal is received from the cordless telephone set in a second mode, the cursor is moved.

With the program selection method, the cursor is moved when a second DTMF signal from the cordless telephone set is received in a second mode. Consequently, a desired program can be selected rapidly with certainty as well as intuitively and directly from within a program selection screen using the cordless telephone set.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1A to 1D are diagrammatic views illustrating definition of several terms used for description of the present invention;

FIG. 3 is a schematic view showing an example of a construction of a broadcasting system to which the present invention is applied;

FIGS. 7A and 7B are block diagrams showing an example of a construction of a receiver shown in FIG. 3;

FIGS. 11A and 11B are block diagrams illustrating operation of the receiver of FIGS. 7A and 7B;

DESCRIPTION OF THE PREFERRED EMBODIMENT

Before preferred embodiments of the present invention are described, in order to clearly indicate the corresponding relationship between different elements of the present invention recited in the appended claims and the preferred embodiments of the present invention hereinafter described, the characteristics of the present invention will be described in connection with the elements with corresponding elements of the embodiments added in parentheses.

Accordingly the present invention further includes a program selection apparatus using a cordless telephone set which includes a plurality of keys corresponding to numerals for being manually operated to input a telephone number includes change-over means (for example, a TEL key in FIG. 9) for changing over a mode of the cordless telephone set between a mode in which the cordless telephone set is used as a telephone set and another mode in which the cordless telephone set is used as a remote commander for remotely controlling an electronic apparatus, display means for displaying a first display (for example, a numeral corresponding to any of keys in FIG. 9) corresponding to a function allocated to any of the keys when the cordless telephone set is used as a telephone set and a second display (for example, any of an arrow marks 711 to 714 in FIG. 9) different from the first display and corresponding to another function allocated to any of the keys when the cordless telephone set is used as a remote commander for remotely controlling the electronic apparatus, and generation means (for example, a transmission circuit 682 in FIG. 10) responsive to a manual operation of any of the keys for generating a signal corresponding to the manually operated key.

Figure 10:
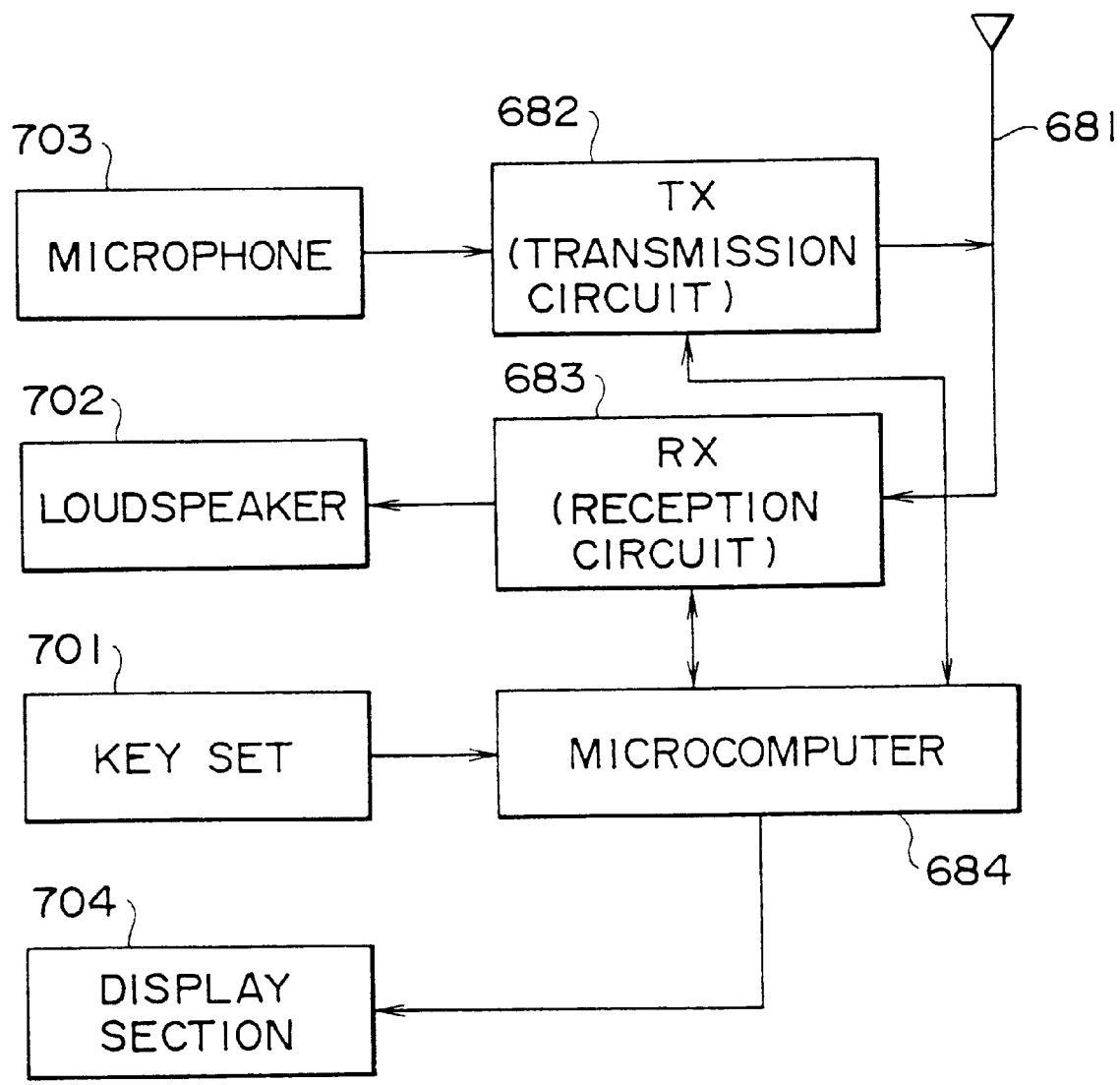
FIG. 10 is a block diagram showing an internal construction of the cordless telephone set (child machine) of FIG. 9.

Accordingly, the present invention further includes the program selection apparatus using a cordless telephone set which further includes a base unit (for example, a base unit 600 in FIG. 7B) and communication means (for example, a transmission circuit 682 and a reception circuit 683 in FIG. 10) for communicating a signal with the base unit, and wherein the generation means generates, when any of the keys is manually operated, a signal instructing the base unit to generate a DTMF signal.

Accordingly, to the present invention further includes an electronic apparatus to which a program selection apparatus using a cordless telephone set is applied includes reception means (for example, a modem 632 in FIG. 7B) for receiving a signal from the cordless telephone set, control means (for example, a modem 632 in FIG. 7B) for performing a line controlling operation when a first DTMF signal from the cordless telephone set is received by the reception means in a first mode of the electronic apparatus, and output means (for example, a multi-channel real time decoder 25 in FIG. 7B) for outputting a signal of a program selection screen in which reduced screens obtained by reducing screens of a plurality of programs are arranged when a second DTMF signal from the cordless telephone set is received by the reception means in a second mode of the electronic apparatus.

Accordingly, the present invention further includes an electronic apparatus to which a program selection apparatus using a cordless telephone set is applied includes output means (for example, a multi-channel real time decoder 25 in FIG. 7B) for outputting a signal of a program selection screen in which reduced screens obtained by reducing screens of a plurality of programs are arranged, reception means (for example, a modem 632 in FIG. 7B) for receiving a signal from the cordless telephone set, control means (for example, a modem 632 in FIG. 7) for performing a line controlling operation when a first DTMF signal from the cordless telephone set is received by the reception means in a first mode of the electronic apparatus, and movement means (for example, a microcomputer 668 in FIG. 8) for moving a cursor arranged on the program selection screen when a second DTMF signal from the cordless telephone set is received by the reception means in a second mode of the electronic apparatus.

Accordingly, the present invention further includes the electronic apparatus to which a program selection apparatus using a cordless telephone set is applied which further includes selection means (for example, a CPU 29 in FIG. 7) for selecting a program of one of the reduced screens at which the cursor is positioned when a third DTMF signal from the cordless telephone set is received by the reception means in the second mode of the electronic apparatus.

It is to be noted that naturally the description does not signify that the individual means are limited to the specific means described above.

FIGS. 1A to 1D illustrate definitions of several terms used in the present specification. FIG. 1A shows an ordinary screen (screen of a program) which signifies a screen on which an original image is displayed in full motion of the frame rate of 30 frames/second (30 fps) in the full size (720×480 pixels).

FIG. 1B shows a multi-screen (program selection screen or array of reduced screens) which signifies a screen on which nine reduced screens of the ⅑ frame size (240×160 pixels) are arranged in a 3×3 matrix. Each of the reduced screens is a screen displayed in full motion (30 fps).

FIG. 1C shows a virtual screen which is an imaginary array screen on which six multi-screens of No. 1 to No. 6 are arranged in a 2×3 matrix. The virtual screen is successively written into a virtual frame memory at timings which satisfy the frame rate of 30 fps. Each reduced screen has the ⅑ frame size (240×160 pixels) and is written so that it may be displayed in full motion (30 fps).

FIG. 1D shows a selection area (area from which data are to be read out) for selecting a multi-screen to be read out from within a virtual screen written in the virtual frame memory in response to a cursor moving operation. The selection area is moved upwardly or downwardly or leftwardly or rightwardly as the cursor moves. When reduced screens are to be displayed in units of a program category or the like, the corresponding reduced screens in the virtual screen are re-arranged on a predetermined child screen.

When an image selected with the selection area is displayed on a monitor apparatus, a multi-preview screen (program selection screen) is displayed. The multi-preview screen is a multi-screen read out from within the virtual screen written in the virtual frame memory in response to a cursor moving operation and displayed on the monitor apparatus. Each of the reduced screens of the multi-preview screen is displayed in full motion (30 fps) in the ⅑ frame size (240×160 pixels).

Figure 2:
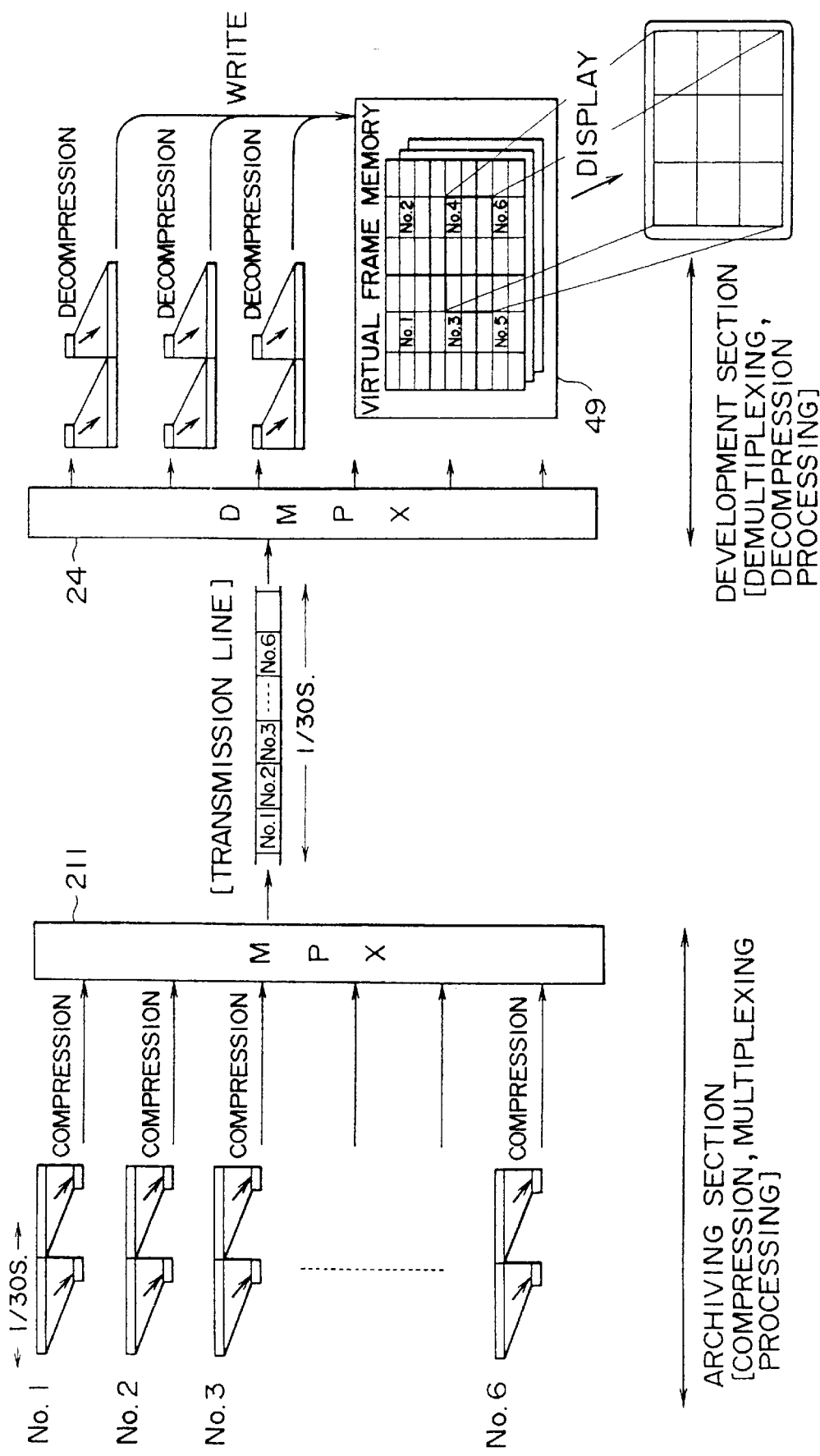
FIG. 2 is a diagrammatic view illustrating archiving processing.

Prior to description of preferred embodiments of the present invention, archiving processing will be described with reference to FIG. 2.

In particular, in the present invention, a plurality of (nine in the embodiments described below) screens of different programs are individually reduced (compressed) by thinning out (sampling) processing so that each of them includes a number of pixels equal to one third that of the original screen in each of the vertical direction and the horizontal direction. Consequently, nine reduced screens each reduced to one ninth in area are produced. Then, the nine reduced screens are disposed at different positions of a multi-screen which is divided into 3×3 areas (reduced screens). A plurality of (six in the following embodiment) multi-screens of No. 1 to No. 6, each of which corresponds to one screen (one broadcasting channel), are produced in this manner. Then, as seen in FIG. 2, the six multi-screens of No. 1 to No. 6 are individually compressed by the MPEG system and then multiplexed by a multiplexer 211 so that they may be transmitted by one transmission channel. In the present specification, the compression and multiplexing processing is referred to as archiving processing.

The data multiplexed into data of one transmission channel by the multiplexer 211 are transmitted to the reception side via a transmission line formed from an artificial satellite, a cable, or a like element.

On the reception side, the data of one transmission channel transmitted thereto via the transmission line are demultiplexed by a demultiplexer 24 so that data of six original broadcasting channels (data of the multi-screens of No. 1 to No. 6 each having nine reduced screens) are separated.

Then, the thus demultiplexed data of the multi-screens of No. 1 to No. 6 (data of the program selection screens) are decompressed (decoded) by the MPEG system and stored into a virtual frame memory 49 so that they may construct a large virtual screen.

Then, a region of arbitrary 3×3 reduced screens of the virtual screen is selected suitably and then outputted and displayed.

FIG. 3 shows a construction of a broadcasting system to which the present invention is applied. A broadcasting station having a video server 53 broadcasts a program. In particular, the broadcasting station produces a program (video and audio signals each in the form of an analog signal) or programs of one or a plurality of broadcasting channels and converts the program or programs into a digital signal or signals. Such conversion into a digital signal is performed also for programs supplied from other broadcasting stations.

Further, the broadcasting station produces data (data for a multi-screen) for program selection of the individual channels representative of contents of the plurality of channels inputted thereto. In particular, the broadcasting station, for example, reduces screens (images) of programs of a plurality of channels inputted thereto and produces an image of a multi-screen including nine reduced screens. Then, for example, programs of nine broadcasting channels are combined to form a multi-screen of a single broadcasting channel.

For example, where one screen (one frame) is formed from 720×480 pixels, the numbers of pixels are reduced to ⅓ in the horizontal direction and the vertical direction, or in other words, pixels are sampled or thinned out, to produce an image of a reduced of 240×160 pixels. Then, such images of the reduced screens (3 pieces×3 pieces) are arranged in the horizontal direction and the vertical direction, to produce a multi-screen including nine reduced screens. The multi-screen is formed from 720×480 pixels.

Since data for program selection (reduced screens) are produced in this manner using programs broadcast normally as they are, the labor for production of a program for program selection independent of programs broadcast normally can be eliminated.

It is to be noted that it is assumed here that, for a program of each channel, a program of a screen reduced, for example, to one third in each of the vertical direction and the horizontal direction is produced from that of the screen of the program (accordingly, in terms of the area, a screen reduced to one ninth that of the program of the broadcasting channel). Accordingly, in this instance, on the viewer side, reduced screens of programs of nine broadcasting channels can be displayed at a time on one screen.

The data are compressed together with corresponding sound by the MPEG system.

A plurality of (for example, 6) such multi-screens (program selection screens) are produced (in other words, reduced screens of totalling 54 (=6×9) programs are produced). Then, the data of the six multi-screens are combined (archived) into data of one transmission channel. Here, data of a plurality of multi-screens including a combination of programs of a plurality of broadcasting channels into data of one broadcasting channel may be hereinafter referred to as archived data (the terminology "archive" is a computer terminology signifying to combine data of a plurality of files into one file).

A video server 53 stores the archived data and further stores programs of the plurality of broadcasting channels compressed by the MPEG system.

The data stored in the video server 53 are subject to error correction processing, modulation (for example, QAM modulation or the like) processing and other necessary processing (for example, encipherment processing, multiplexing processing, up conversion and so forth). Then, a signal obtained as a result of the processing is transmitted to the viewer side via a cable 611. In other words, the archived data of the multi-screen are transmitted together with the programs of the plurality of broadcasting channels to the viewer side via the cable 611. Accordingly, when the screen of each program is considered to be a screen of the full size, the screens of the full size and the reduced screens obtained by reduction of the screens of, the full size are transmitted simultaneously from the broadcasting station.

It is to be noted that, while the programs of the plurality of broadcasting channels and the archived data are transmitted to the viewer side via the cable 611, they may otherwise be transmitted to the viewer side from the video server 53 via a satellite such as a broadcasting satellite or a communications satellite or in the form of a ground wave or by some other suitable signal distribution method. Further, the programs of the plurality of channels and the archived data may be transmitted not via a single transmission line but via a plurality of transmission lines to the viewer side (for example, the programs of the plurality of broadcasting channels may be transmitted via an artificial satellite while the archived data are transmitted via a cable).

On the viewer side, the data transmitted from the video server 53 via the cable 611 (programs of the plurality of broadcasting channels and archived data) are supplied to a receiver (set top box) 2.

The receiver 2 performs necessary processing to the data from the cable 611, and a video signal from the receiver 2 is supplied to and displayed on a monitor apparatus 4 which may be, for example, a television receiver while an audio signal is supplied to and outputted as sound from a loudspeaker not shown. In particular, when the receiver 2 is set so that a particular broadcasting channel is selected, a program of the particular broadcasting channel is displayed on the monitor apparatus 4. On the other hand, when archive data are selected, reduced screens of programs of a predetermined number of broadcasting channels (in the present embodiment, nine channels as described hereinabove) from among a plurality of reduced screens are simultaneously displayed on the monitor apparatus 4. Accordingly, in this instance, the viewer can observe the multi-screen and recognize contents of the programs of the plurality of broadcasting channels being currently broadcast (details will be hereinafter described). The screen for program selection may be hereinafter referred to as multi-preview or multi-preview screen.

It is to be noted that, when data are transmitted from the broadcasting station via an artificial satellite or the like, they are received by the receiver 2 by means of an antenna (not shown). Further, when data are transmitted via a ground wave or the like from the broadcasting station, they are received by an antenna for ground waves not shown and then supplied to the receiver 2.

The receiver 2 includes, as hereinafter described with reference to FIG. 7B, a modem unit 631, to which the telephone set (parent machine) 600 is connected. Also between the telephone set (parent machine) 600 and the cordless telephone set (child machine) 5, a signal can be communicated using a RF signal.

Figure 4:
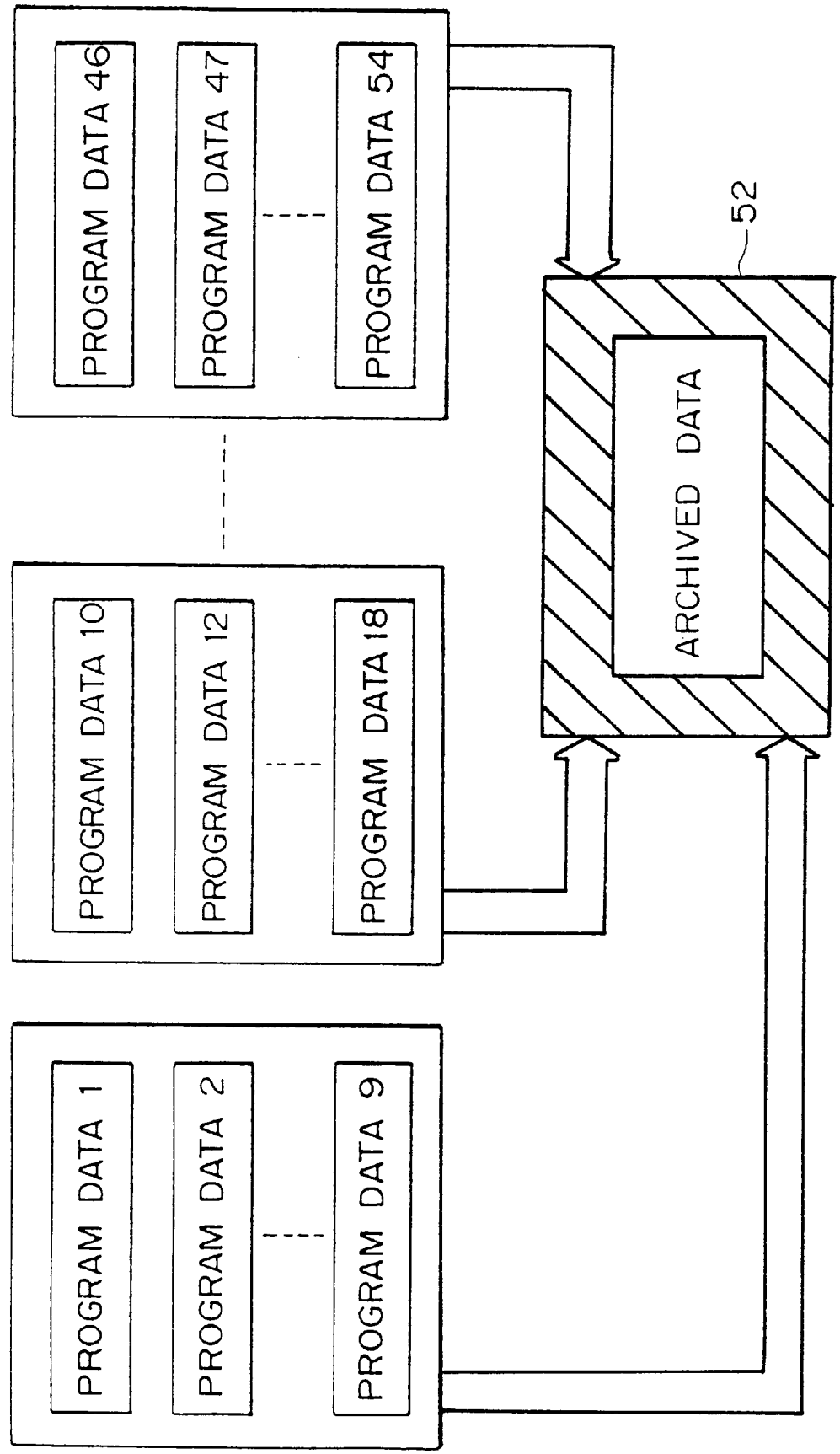
FIG. 4 is a diagrammatic view illustrating a manner in which archived data are produced.

FIG. 4 illustrates a manner in which archive data are produced. As seen from FIG. 4, the archiving processing reduces nine screens (images) of programs of broadcasting channels to produce a single multi-screen. Data of the single multi-screen can be handled, on the viewer side, as data of a broadcasting channel or independent data for program selection. Then, six such multi-screens are produced and archived into data (archived data) of one transmission channel.

It is to be noted that the program data illustrated in FIG. 4 include reduced screen data as well as audio signals of individual broadcasting channels as described hereinabove.

Further, a plurality of reduced screens of programs of different broadcasting channels can be re-arranged into a predetermined array condition such that, for example, they are arranged for individual categories of programs.

Figure 5:
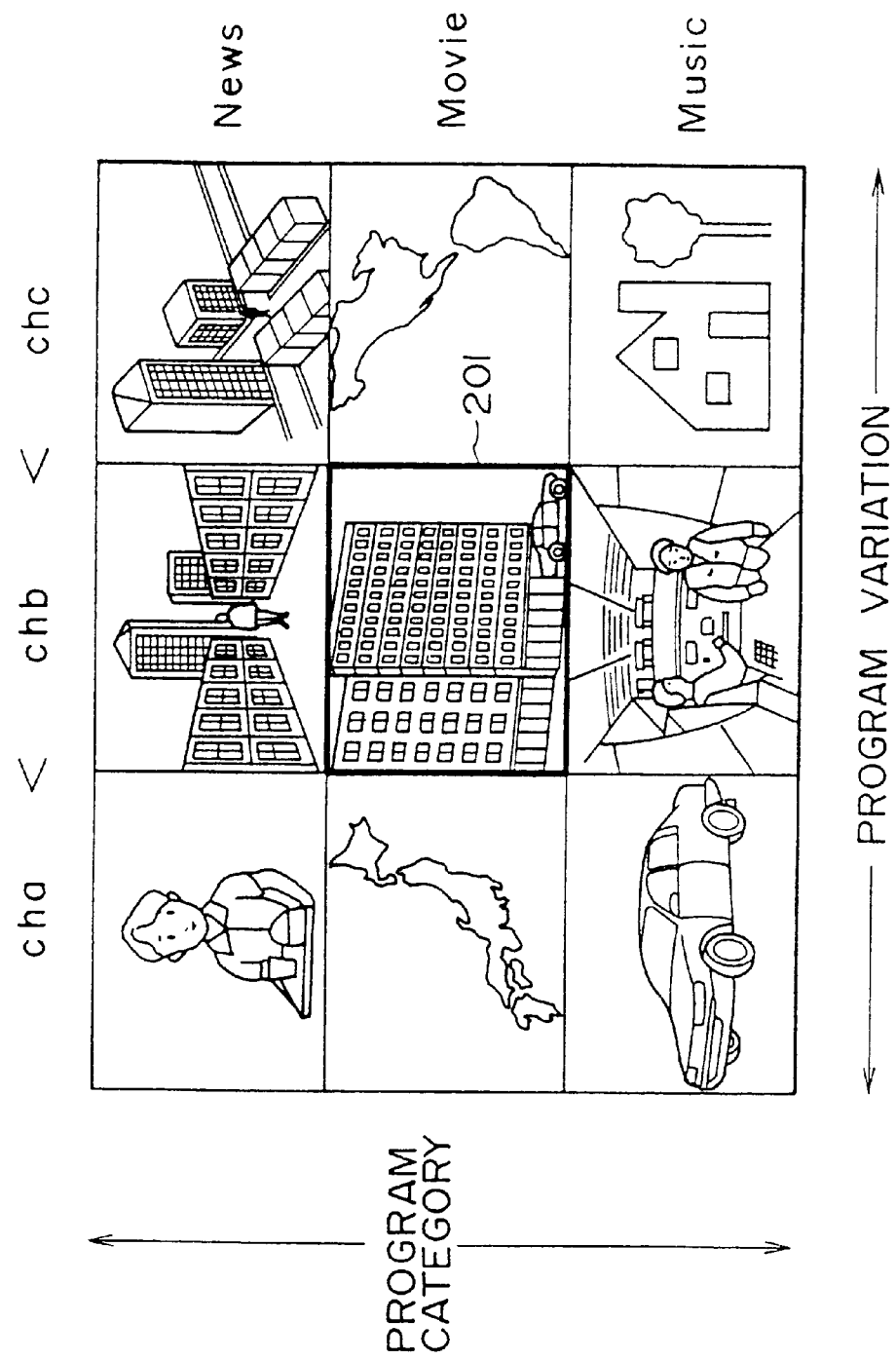
FIG. 5 is a schematic view illustrating a manner of arrangement of reduced screens.

In particular, for example, reduced screens of different categories of programs may be arranged in the vertical direction while reduced screens of same categories of programs are arranged in the horizontal direction as seen in FIG. 5. More particularly, for example, reduced screens of news programs are arranged in the first horizontal row; reduced screens of movie programs are arranged in the second horizontal row; and reduced screens of music programs are arranged in the third horizontal row. Further, in this instance, in each horizontal row, reduced screens of programs of the same category are arranged, for example, in an ascending order of broadcasting channels of the programs or in an alphabetical order of the titles of the programs.

When the number of categories is four or more or when the number of programs of a category is four or more, a program or programs of an excessive number of categories or of an excessive number of programs of a category are arranged in another multi-screen. Then, a single virtual frame is formed from a plurality of (six) multi-screens (this will be hereinafter described).

Where a multi-preview screen in which reduced screens are arranged in such a manner as described above is displayed on the viewer side, the viewer can find out a desired program readily by observing (visually scanning) the multi-preview screen in a horizontal direction along a row of the category of the desired program.

Further, in this instance, if a predetermined cursor 201 is displayed on a predetermined one of the reduced screens forming such a multi-preview screen as seen in FIG. 5 and then moved on the multi-preview screen, then the viewer can find out and select a desired program readily.

By the way, the system may be constructed so as to make it possible to display, on the viewer side, the numbers of broadcasting channels together with a plurality of reduced screens as a multi-preview screen so that the viewer may select the broadcasting channel of a desired program by inputting the number of the broadcasting channel. In this instance, however, it may possibly occur that, for example, the viewer may mistake the broadcasting channel or may manually input a wrong number different from that corresponding to the intended broadcasting channel. Therefore, after such a multi-preview screen as seen in FIG. 5 is displayed, it is desirable to display a parent screen of a desired program in response to direct selection of a reduced screen corresponding to the program.

Figure 6:
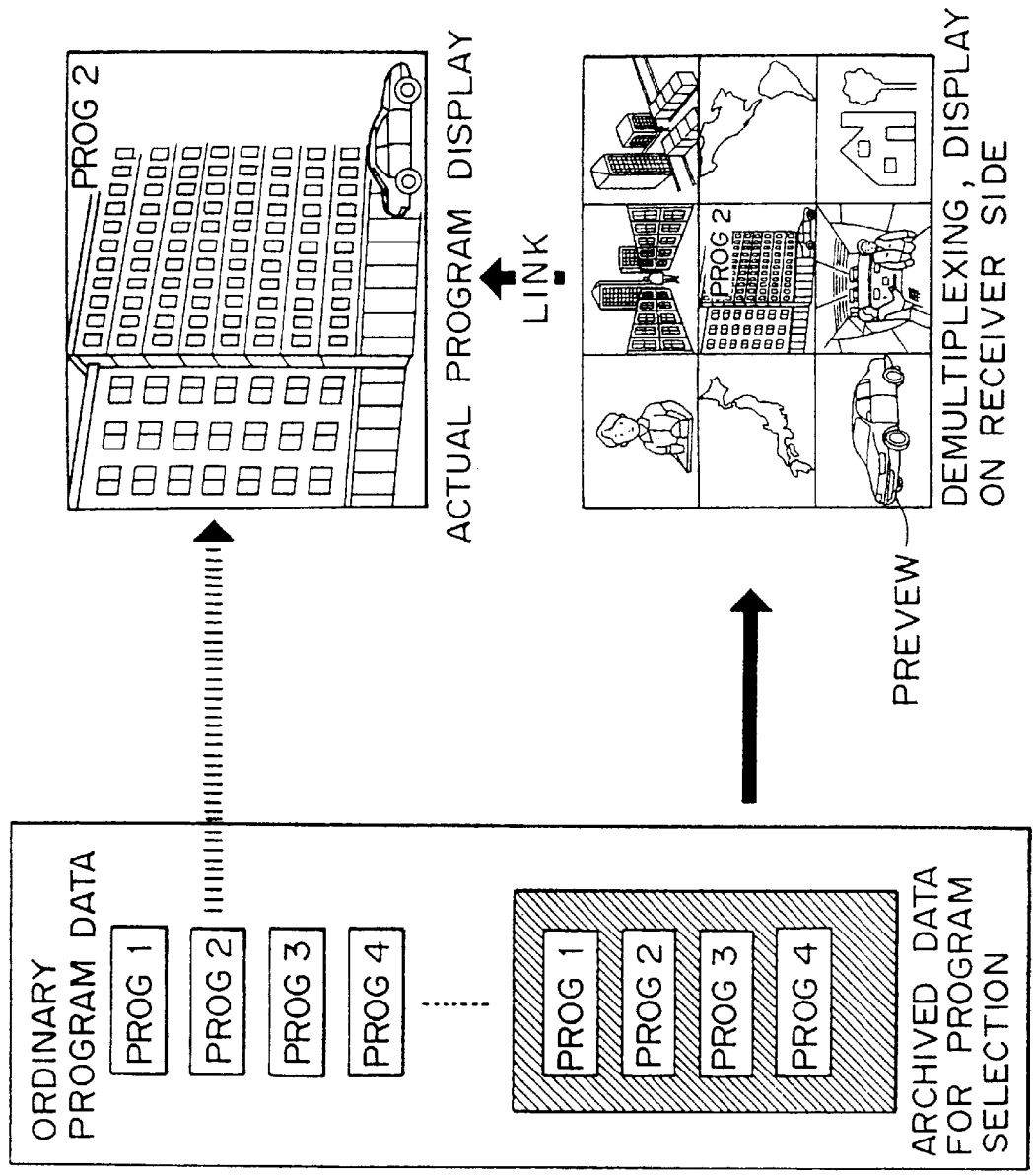
FIG. 6 is a diagrammatic view illustrating a link between data of an ordinary program and a reduced screen of the program.

To this end, a link is provided between each reduced screen and a corresponding program. In particular, for example, the archiving section 52 adds, to data of each reduced screen, the number of a broadcasting channel of a program corresponding to the reduced screen and transmits the number of the broadcasting channel as EPG data. Consequently, when a reduced screen forming a multi-preview screen is selected as seen in FIG. 6, a program linked to the reduced screen, that is, a screen (program) of the full size corresponding to the selected reduced screen, can be displayed. It is to be noted that FIG. 6 illustrates a manner wherein one of nine reduced screens forming a multi-preview screen which is disposed at the center is selected, and consequently, in FIG. 6, a program PROG2 corresponding to the selected reduced screen is shown displayed in place of the multi-preview screen.

Figure 7A:
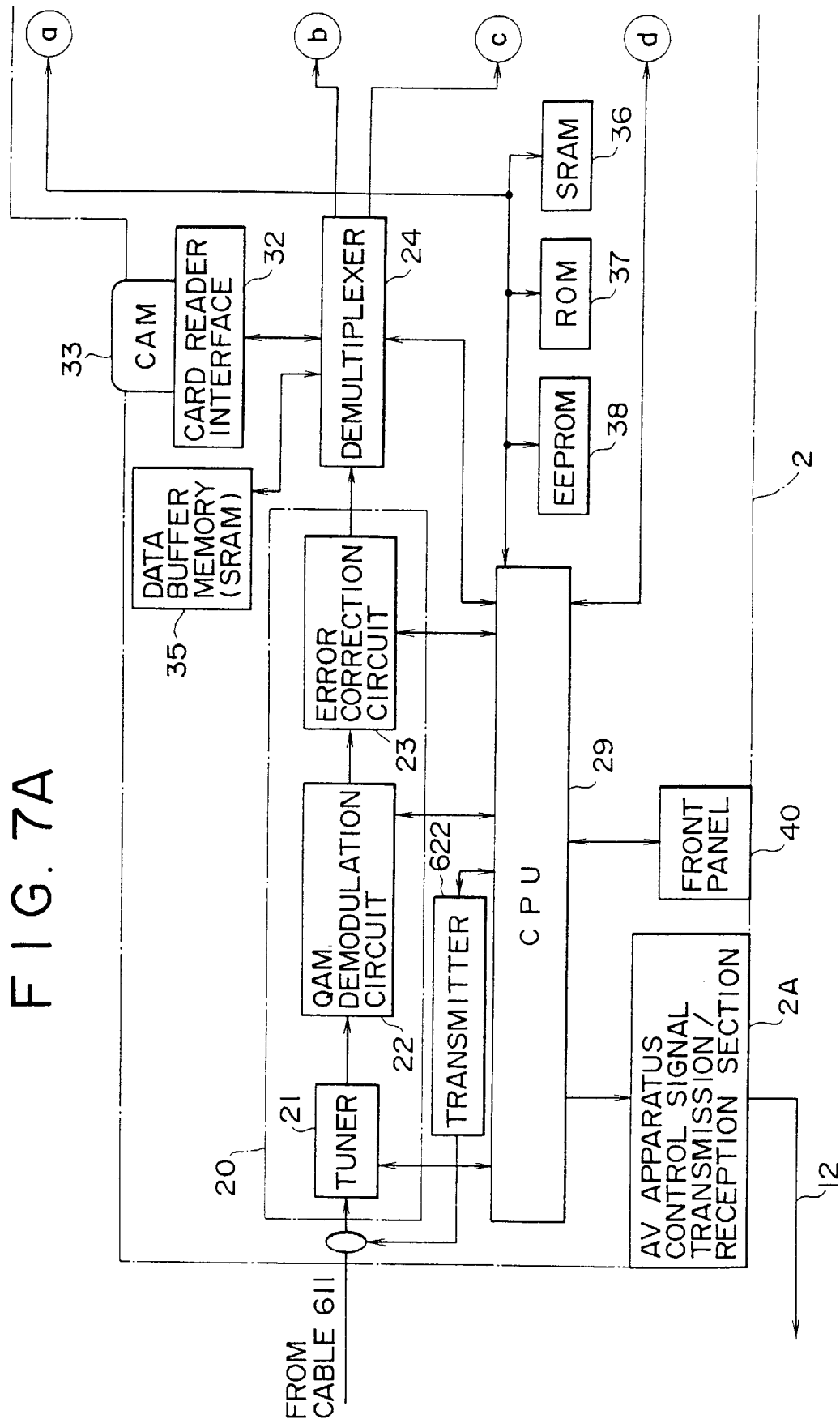

FIGS. 7A and 7B show an example of an internal construction of the receiver 2 for receiving the broadcast described hereinabove. A RF signal outputted from the cable 611 is supplied to and demodulated by a tuner 21 of a front end circuit 20. The output of the tuner 21 is supplied to a QAM demodulation circuit 22, by which it is QAM demodulated. The output of the QAM demodulation circuit 22 is supplied to an error correction circuit 23, by which errors are detected and corrected.

A CAM (Conditional Access Module) 33 formed from, for example, an IC card including a CPU, a ROM, a RAM and so forth stores keys necessary for decipherment of a cipher together with a decipherment program. When a broadcasting station transmits data to which encipherment processing has performed, keys and decipherment processing are required to decipher the cipher. Therefore, the keys are read out from the CAM 33 via a card reader interface 32 and supplied to the demultiplexer 24. The demultiplexer 24 deciphers the enciphered signal using the keys.

It is to be noted that the CAM 33 stores, in addition to the keys and the decipherment program necessary for decipherment of a cipher, accounting information.

The demultiplexer 24 receives, as an input thereto, a signal outputted from the error correction circuit 23 of the front end circuit 20 and stores the received signal into a data buffer memory (SRAM: Static Random Access Memory) 35 once. Then, the signal is read out suitably and used for decipherment as described above. Then, when the result of the decipherment is ordinary program data, the demultiplexer 24 supplies image data or audio data forming the program data to the multi-channel real time decoder 25 or an MPEG audio decoder 26. The EPG data are stored into a predetermined area of the data buffer memory 35.

The multi-channel real time decoder 25 includes built-in MPEG video decoders 25-1 to 25-6 and DRAMs 25a-1 to 25a-6 in order that screen data of programs of six broadcasting channels can be decoded as hereinafter described with reference to FIGS. 11A and 11B. The multi-channel real time decoder 25 thus stores image data (digital image data) inputted thereto suitably into the DRAMs 25a-1 to 25-6 and executes decoding processing of the video signals in a condition compressed by the MPEG system.

The decoded video data are supplied, when they are data of an ordinary program, to an NTSC encoder 27, by which they are converted into a luminance signal (Y), a chroma signal (C) and a composite signal (V) of the NTSC system. The luminance signal and the chroma signal are outputted individually as S video signals via a pair of buffer amplifiers 28Y and 28C, respectively. The composite signal is outputted via a further buffer amplifier 28V.

Meanwhile, video data of a multi-screen are supplied to and stored into the virtual frame memory 49. Then, predetermined nine reduced screens are read out in accordance with the necessity and supplied to the NTSC encoder 27.

It is to be noted that an MPEG 2 decoding LSI (STi3500) by SGS-Thomson Microelectronics can be used for the MPEG video decoders 25-i of FIG. 11. An outline of the product is presented, for example, by Martin Bolton, in Nikkei Electronics, Nikkei PB Company, No. 603, Mar. 14, 1994, pp.101–110.

Meanwhile, a transport stream of the MPEG2 (MPEG2-Transportstream) is described in Newest MPEG Textbook, ASCII, Aug. 1, 1994, pp.231–253.

The MPEG audio decoder 26 suitably stores the digital audio signals supplied thereto from the demultiplexer 24 into a DRAM 26a and executes decoding processing of the audio data in a condition compressed by the MPEG system. The thus decoded audio data are converted from digital signals into analog signals by a digital to analog (D/A) converter 30, and the audio signal of the left channel is outputted via a buffer amplifier 31L while the audio signal of the right channel is outputted via a buffer amplifier 31R.

A RF modulator 41 converts the composite signal outputted from the NTSC encoder 27 and the audio signals outputted from the digital to analog converter 30 into a RF signal and outputs the RF signal. Further, when a TV mode in which a television broadcasting signal by a ground wave is to be received is set, the RF modulator 41 passes therethrough a RF signal of the NTSC signal inputted thereto from an AV apparatus (not shown) such as a cable box so that the RF signal is outputted as it is to a VCR (VTR) (not shown) or another AV apparatus (not shown).

In the present embodiment, the video signal and the audio signals are supplied to the monitor apparatus 4 via the AV line 11.

A CPU (Central Processor Unit) 29 executes various processes in accordance with a program stored in a ROM 37. For example, the CPU 29 controls the tuner 21, the QAM demodulation circuit 22, the error correction circuit 23, the virtual frame memory 49 and so forth. Further, the CPU 29 controls the AV apparatus control signal communication section 2A and outputs a predetermined control signal to another AV apparatus (in the present embodiment, the monitor apparatus 4) or receives a control signal from such another AV apparatus.

A predetermined instruction can be inputted directly to the CPU 29 by manually operating any of operation buttons and switches (not shown) provided on a front panel 40 of the receiver 2 and can be inputted also by manually operating a cordless telephone set (child machine) 5 which has a function as a remote commander.

In particular, if the cordless telephone set (child machine) 5 is manually operated, then a RF signal is emitted from an antenna 681 (FIG. 10) of the cordless telephone set (child machine) 5 and received by the base unit (telephone parent receiver) 600. An output of the base unit 600 is supplied to the modem unit 631 via modular jacks 601 and 636

The modem unit 631 connected to the CPU 29 includes a modem 632 having a built-in DTMF decoder 633. The modem 632 is connected to a telephone line via a modular jack 635 and connected to the modular jack 636 via an external telephone off-hook detection circuit 634.

When a signal supplied from the front end circuit 20 is EPG data, the demultiplexer 24 supplies and stores the EPG data to and into the data buffer memory 35.

Data which are desired to be maintained even after disconnection of the power supply, for example, a reception program history of the tuner 21 for four weeks and the number of a channel (last channel) which has been received immediately before disconnection of the power supply are stored suitably into an EEPROM (Electrically Erasable Programmable Read only Memory) 38. Then, for example, when the power source is connected subsequently, the same channel as the last channel is received again. However, if no last channel is stored, then a channel stored as a default channel in the ROM 37 is received.

Further, when a sleep mode is set, even if the power source is in a disconnected condition, the CPU 29 keeps minimum necessary circuits such as the front end circuit 20, the demultiplexer 24 and the data buffer memory 35 in an operative condition, and besides counts the current time from time information included in a received signal and also performs such control as to cause a required circuit to perform a predetermined operation at a required time (such as timer picture recording). For example, the CPU 29 executes automatic timer picture recording of a reserved program in cooperation with an external VCR.

Further, when the CPU 29 tries to produce predetermined OSD (On-Screen Display) data, it controls the MPEG video decoders 25-i. Under the control of the CPU 29, the MPEG video decoders 25-i produce predetermined OSD data and write the OSD data into OSD areas of the DRAMs 25a-i, whereafter they read out and output the OSD data. Consequently, predetermined characters, a predetermined graphic form (for example, a cursor, a broadcasting channel of a program being currently outputted from the receiver 2, or a bar whose length varies in response to the sound volume) or the like can be suitably outputted to the monitor apparatus 4 so that it may be displayed on the monitor apparatus 4.

A transmitter 622 is controlled by the CPU 29 and generates and outputs a predetermined signal to the video server 53 via the cable 611.

Figure 8:
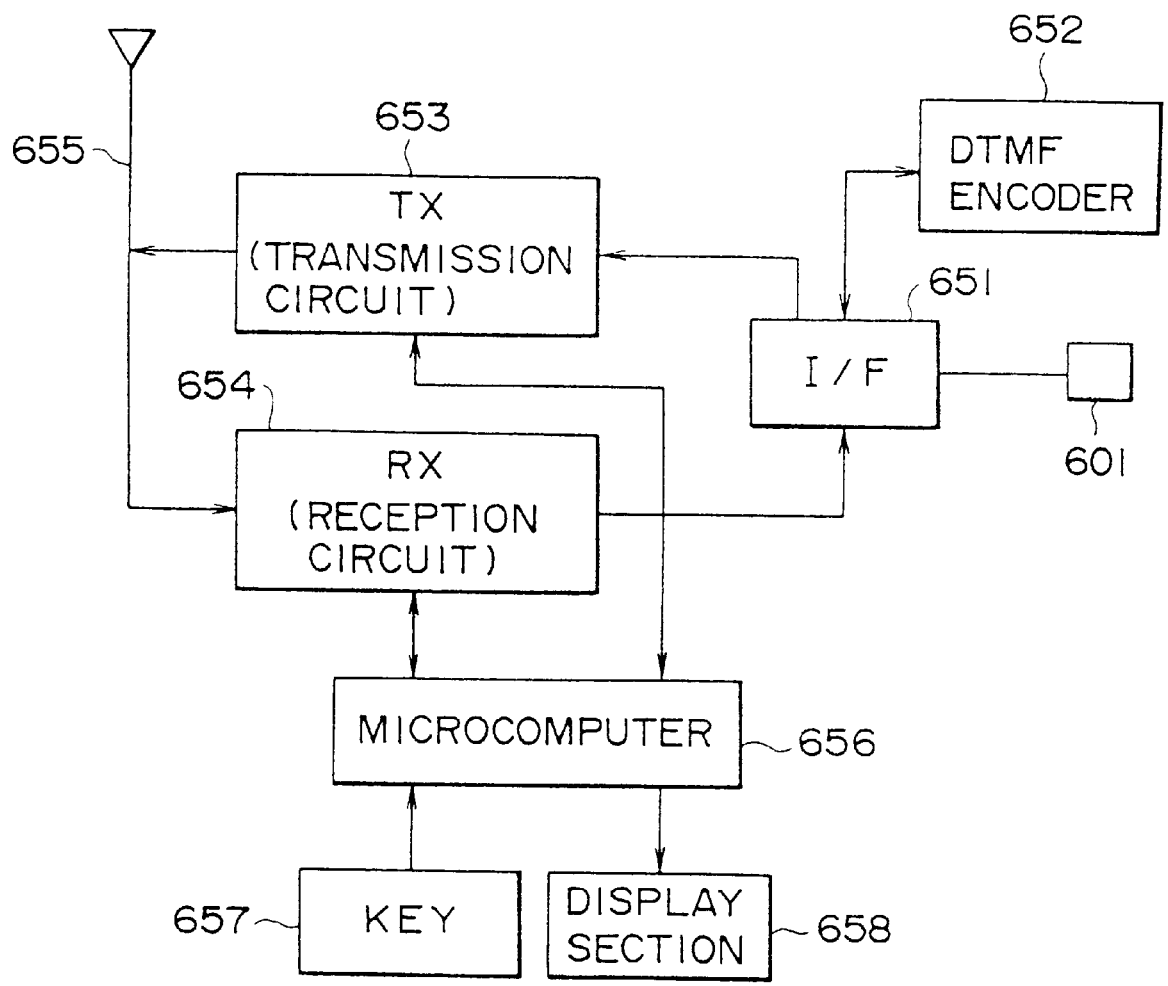
FIG. 8 is a block diagram showing a detailed construction of a base unit shown in FIG. 7.

FIG. 8 shows an example of a construction of a base unit 600. The modular jack 601 is connected to a line interface (I/F) 651. Also a DTMF encoder 652 is connected to the line interface 651. The DTMF encoder 652 encodes a command inputted thereto into a DTMF signal and outputs the DTMF signal.

The line interface 651 outputs a signal to be transmitted to the child machine 5 to a transmission circuit (TX) 653. The transmission circuit 653 converts the transmission signal into a digital signal, modulates the digital signal and outputs the modulated signal as a RF signal from an antenna 655. A reception circuit (RX) 654 receives and demodulates a RF signal transmitted thereto from the child machine 5 via the antenna 655, and outputs an audio signal to the line interface 651 and outputs a command to a microcomputer 656.

The microcomputer 656 which includes a CPU, a ROM, a RAM and so forth (not shown) built therein controls the transmission circuit 653 and the reception circuit 654 in response to an input from a key 657. Further, a predetermined character or characters, a symbol or symbols and so forth are displayed on a display section 658.

It is to be noted that, for the convenience of illustration and description, a microphone and a loudspeaker are omitted in FIG. 8.

Figure 9:
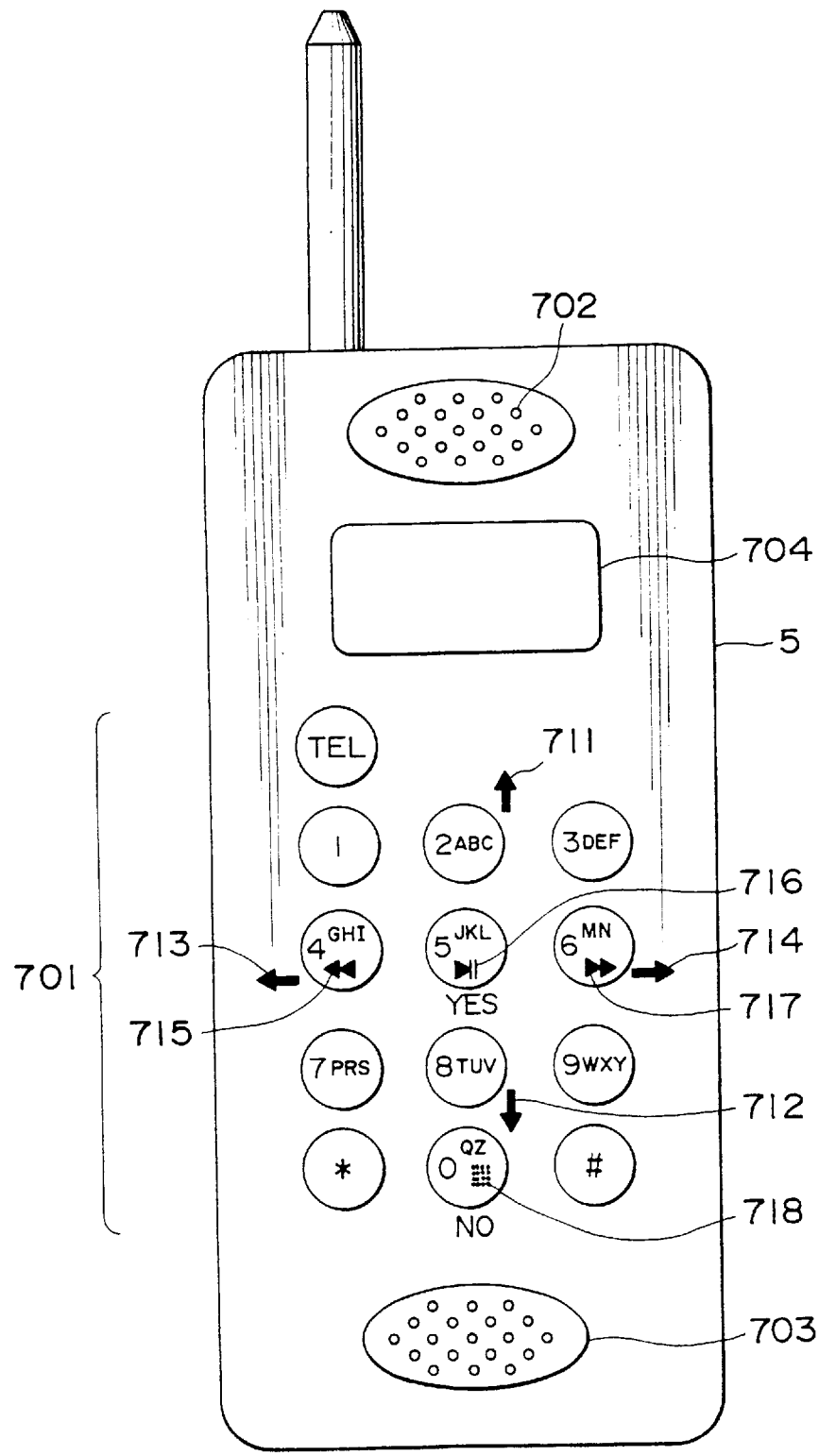
FIG. 9 is a schematic front elevational view showing an example of a construction of a cordless telephone receiver (child machine) shown in FIG. 3.

FIG. 9 shows an example of a construction of the front face of the cordless telephone set (child machine) 5. Referring to FIG. 9, the cordless telephone set (child machine) 5 has a loudspeaker 702 located at an upper portion thereof and has a display apparatus 704 located at a portion thereof below the loudspeaker 702. A key set 701 is located at a portion of the cordless telephone set (child machine) 5 below the display apparatus 704, and a microphone 703 is located below the key set 701.

The key set 701 includes, in the present embodiment, keys on which numerals 0 to 9 are indicated, keys on which the marks * and # are indicated, and an additional key on which the characters TEL are indicated.

Further, the characters ABC are indicated on the key of the numeral 2; DEF on the key of the numeral 3; GHI on the key of the numeral 4; JKL on the key of the numeral 5; MN on the key of the numeral 6; PRS on the key of the numeral 7; TUV on the key of the numeral 8; WXY on the key of the numeral 9; and QZ on the key of the numeral 0.

Further, a rewinding mark 715 symbolizing rewinding of a reproduction point is indicated on the key of the numeral 4; a pause mark 716 symbolizing pause of reproduction is indicated on the key of the numeral 5; and a fast feeding mark 717 symbolizing fast feeding of a reproduction point is indicated on the key of the numeral 6.

Further, a mark 718 symbolizing a function of calling a program selection screen (multi-screen) is indicted on the key of the numeral 0. The mark 718 consists of small square marks.

Further, as marks symbolizing movements of a cursor, an arrow mark 711 directed upwardly is indicated in the proximity of the numeral 2 key; another arrow mark 712 directed downwardly is indicated in the proximity of the numeral 8 key; a further arrow mark 713 directed leftwardly is indicated in the proximity of the numeral 4 key; and a still further arrow mark 714 directed rightwardly is indicated in the proximity of the numeral 6 key.

FIG. 10 shows an example of an internal construction of the child machine 5. An audio signal inputted from the microphone 703 is inputted to a transmission circuit 682, by which it is converted into a digital signal and modulated. The thus modulated audio signal is transmitted as a RF signal to the base unit 600 via the antenna 681.

A reception circuit 683 demodulates a RF signal received by the antenna 681, and outputs, from within the demodulated signal, an audio signal to the loudspeaker 702 but outputs a command to a microcomputer 684.

Also the microcomputer 684 includes a CPU, a ROM and a RAM not shown and controls various operations in response to an operation signal from the key set 701.

Further, the microcomputer 684 controls the display section 430 so as to perform a predetermined displaying operation when necessary.

Subsequently, operation of the receiver 2 when the numeral 0 key (which may be hereinafter referred to suitably as preview button) of the child machine 5 is manually operated will be described. When the preview button is manually operated, a signal corresponding to the preview button is inputted from the key set 701 to the CPU 29. In this instance, the microcomputer 684 controls the transmission circuit 682 to generate a signal corresponding to the input. The transmission circuit 682 thus transmits a signal corresponding to the key as a RF signal (radio wave) to the base unit 600 via the antenna 681.

The reception circuit 654 of the base unit 600 receives and demodulates the RF signal via the antenna 655 and outputs a result of the demodulation to the CPU 656. The microcomputer 656 controls the DTMF encoder 652 via the line interface 651 to generate a DTMF signal corresponding to the input signal. The DTMF signal generated is outputted via the line interface 651 from the modular jack 601.

The DTMF signal outputted from the modular jack 601 of the base unit 600 is inputted to the modem unit 631 via the modular jack 636 of the receiver 2. In the modem unit 631, the DTMF signal is inputted to the modem 632 via the external telephone off-hook detection circuit 634.

The modem 632 decodes the DTMF signal inputted thereto into a code of an original numeral (in the present case, 0) by the built-in DTMF decoder 633 thereof. The modem 632 sets, when a code corresponding to a numeral key is inputted in a condition wherein an input corresponding to the TEL key has not been accepted, a remote control mode and processes the inputted code not as an input of a telephone number but as an input as a remote commander. In this instance, the modem 632 outputs the code obtained by decoding of the DTMF signal to the CPU 29. Further, in such remote control mode, the modem 632 ignores an off-hook detection output of the external telephone off-hook detection circuit 634.

In the ROM 37 of the receiver 2, information representing that the function applied to the numeral 0 key as a remote commander is a function of causing a multi-preview screen to be displayed is registered. Thus, in accordance with the registration, the CPU 29 instructs the front end circuit 20 to receive a transmission channel for archived data. In response to the instruction, archived data are supplied from the front end circuit 20 to the demultiplexer 24.

In particular, referring to FIGS. 11A and 11B, the tuner 21 receives and demodulates a signal from the transmission channel for exclusive use for a multi-screen. The output of the tuner 21 is then QAM demodulated by the QAM demodulation circuit 22, and then error correction processing of the output of the QAM demodulation circuit 22 is performed by the error correction circuit 23. The output of the error correction circuit 23 is inputted to the demultiplexer 24. The data inputted to the demultiplexer 24 include packets of video data of six No.1 to No. 6 multi-screens described above and packets of audio data of the 54 programs.

If it is assumed that those packets have data IDs (packet IDs) of the numbers 1 to 6 added thereto, then the data having the data IDs of the numbers 1 to 6 are demultiplexed. Then, the data are decoded by corresponding ones of the MPEG video decoders 25-1 to 25-6 of the multi-channel real time decoder 25 and then supplied to and stored into the DRAMs 25a-1 to 25a-6. In particular, the multi-screen of the packet ID 1 is stored into the DRAMs 25a-1, and similarly, the multi-screens of the data IDs 2 to 6 are stored into the DRAMs 25a-2 to 25a-6, respectively.

Then, the six multi-screens stored in the DRAMs 25a-1 to 25a-6 are read out from them and developed and stored into the virtual frame memory 49 such that they may construct one virtual screen. In the arrangement shown in FIG. 11, the multi-screen indicated by No. 1 of the data ID 1 is arranged at the left upper corner of the virtual screen; the multi-screen indicated by No. 2 of the data ID 2 is arranged on the right side of the multi-screen of the data ID 1; the multi-screen indicated by No. 3 of the data ID 3 is arranged on the lower side of the multi-screen of the data ID 1; the multi-screen indicated by No. 4 of the data ID 4 is arranged on the right side of the multi-screen of the data ID 3; the multi-screen indicated by No. 5 of the data ID 5 is arranged on the lower side of the multi-screen of the data ID 3; and the multi-screen of the data ID 6 is arranged on the right side of the multi-screen of the data ID 5.

It is to be noted that, as described hereinabove, the data of the six multi-screens indicated by No. 1 to No. 6 are transmitted by one transmission channel (by a carrier from one transponder). Accordingly, even if the front end circuit 20 including the tuner 21 is provided by one as seen in FIG. 10, if the six MPEG video decoders 25-1 to 25-6 are provided, then six multi-screens can be received at a time and stored into the virtual frame memory 49.

If one or more multi-screens forming a multi-screen are transmitted via a transmission channel or channels corresponding to another transponder or transponders, then in order to receive the multi-screen of the transmission channel or one of the transmission channels, the reception frequency of the tuner 21 must be changed over, and after all, it is impossible to receive all multi-screens at a time (naturally this becomes possible if a plurality of front end circuits 20 are provided, which, however, complicates the construction and raises the cost). Therefore, only one transmission channel (common transmission channel) is preferably used to transmit the multi-screen.

Figure 12:
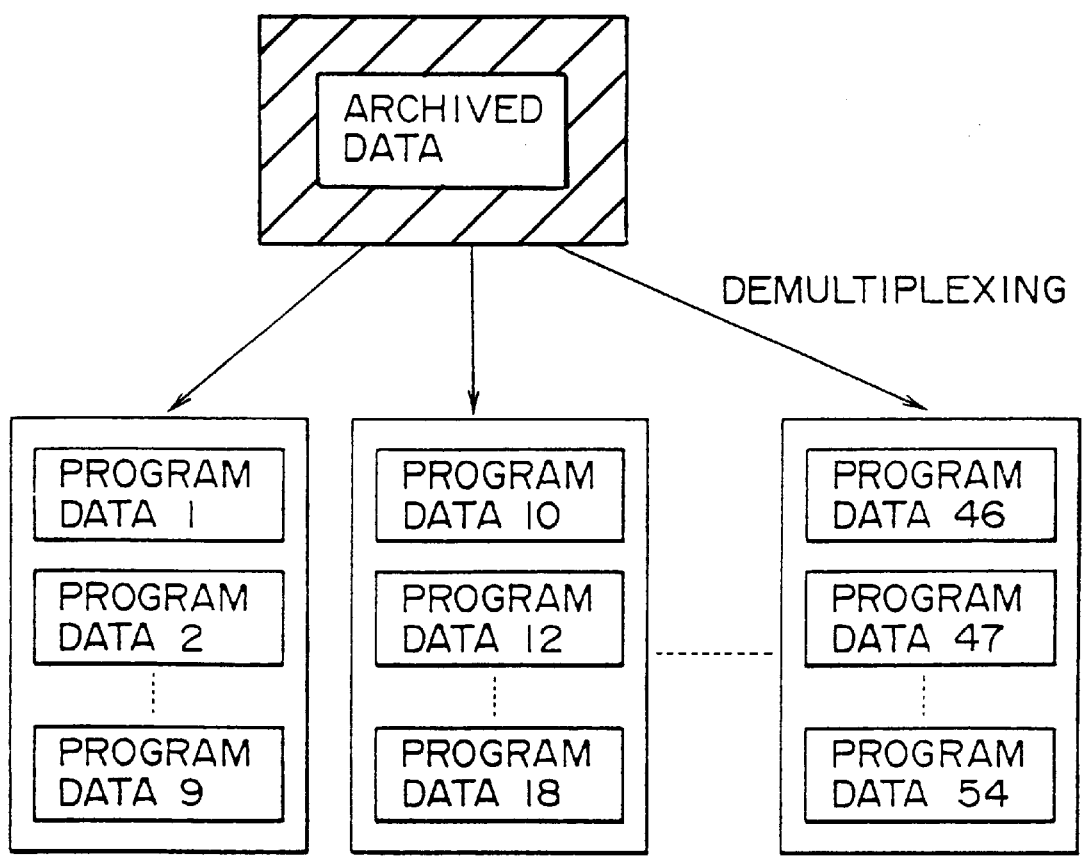
FIG. 12 is a diagrammatic view illustrating a manner in which archived data are separated.
Figure 13:
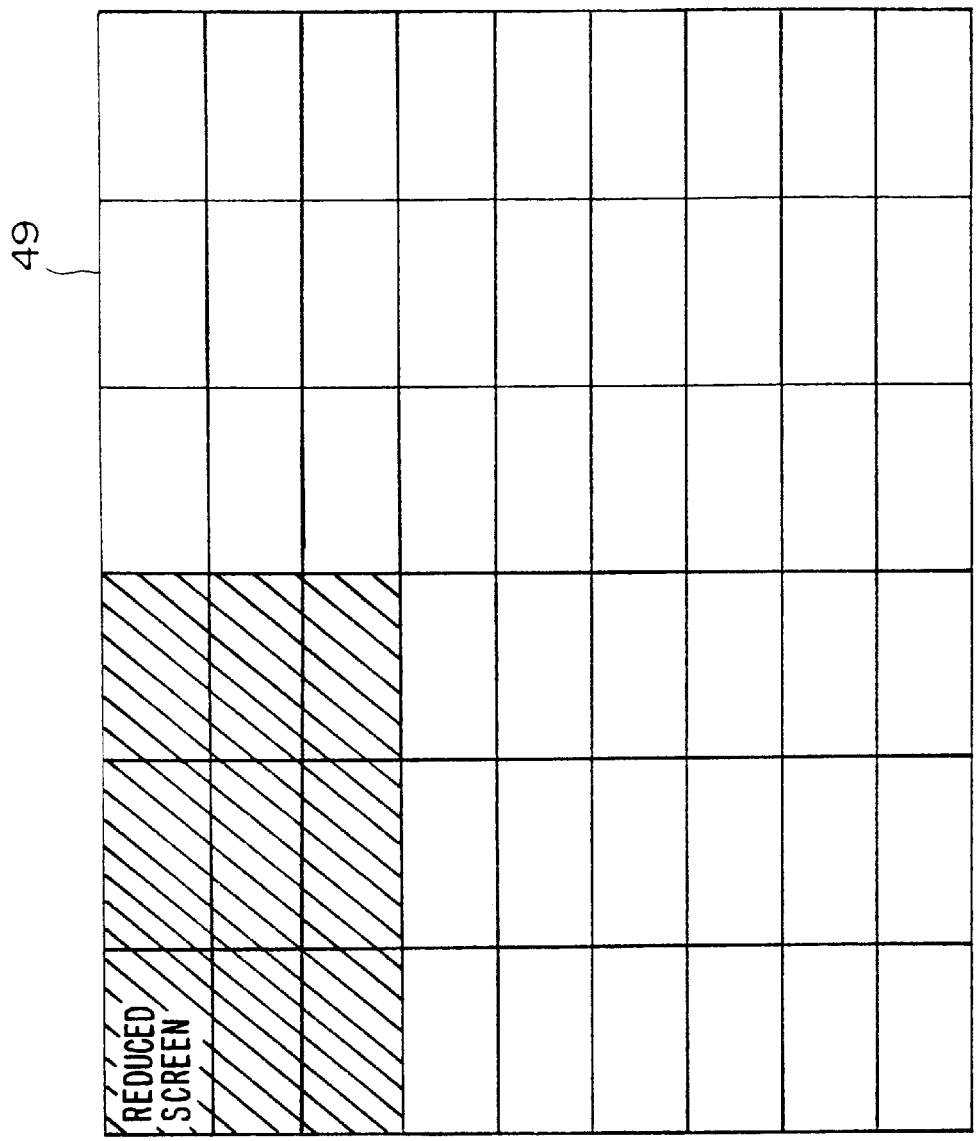
FIG. 13 is a diagrammatic view illustrating a condition wherein reduced screens are stored in a matrix array in a virtual frame memory.

The processing of receiving a plurality of multi-screens from a single transmission channel (archived data) and storing the multi-screens into the virtual frame memory 49 is schematically illustrated in FIGS. 12 and 13.

In particular, when the demultiplexer 24 receives archived data which include six multi-screens, it separates the archived data into individual multi-screens as seen in FIG. 12. Then, the resulted six multi-screens are stored in a matrix into a virtual screen of the virtual frame memory 49 as seen in FIG. 13. Accordingly, the virtual screen can be considered to be a screen on which 6×9 reduced screens of programs of different broadcasting channels transmitted thereto from the broadcasting station are arranged. Since each of the reduced screens is an ordinary screen of a program of a reduced size, it exhibits an image of full motion of the frame rate of 30 fps (full moving picture), and accordingly, if the entire virtual screen is displayed, then contents of programs (reduced screens) of 54 broadcasting channels transmitted thereto from the broadcasting station can be observed in full motion.

Here, when the reduced screens are stored into the virtual frame memory 49, if the six multi-screens are not arranged as they are at the respective 2×3 predetermined positions of the virtual frame memory 49 but the individual reduced screens are managed independently of each other by the CPU 29 (pixel data of the virtual frame memory 49 are managed in units of 240×160 pixels), then the reduced screens can be arranged at arbitrary positions of the 6×9 regions of the virtual frame memory 49.

In this instance, for example, the reduced screens may be arranged in order such that a predetermined number of them are arranged in the uppermost horizontal row of the virtual frame memory 49 from the left end toward the right and then next those of the same number are arranged in the second horizontal row from the left end toward the right, whereafter the other reduced screens are successively arranged in a similar manner, or may be arranged for individual program categories described hereinabove with reference to FIG. 5. when the reduced screens are arranged for individual program categories, the broadcasting station side (video server 53 side) may add to each reduced screen the category of a program corresponding to the reduced screen as EPG data. In this instance, the receiver 2 is constructed such that it reads the category of the program added to the reduced screen from the EPG data and arranges such reduced screens for individual program categories on the virtual frame memory 49.

Alternatively, it is possible to arrange reduced screens on the virtual frame memory 49 in a manner of arrangement desired by a viewer. In particular, where the broadcasting side adds the category of a program to a reduced screen as described above, the receiver side apparatus can be constructed such that the cordless telephone set (child machine) 5 is manually operated to input a predetermined instruction to set the order of categories of programs so that reduced screens are successively arranged in the set order on the virtual frame memory 49 beginning with the uppermost horizontal low.

Further, for example, where the broadcasting station side adds to each reduced screen the broadcasting channel of a program corresponding to the reduced screen, the receiver side apparatus can be constructed such that the cordless telephone set (child machine) 5 is manually operated to set the order of broadcasting channels of programs so that reduced screens are successively arranged in the set order on the virtual frame memory 49 beginning with the uppermost horizontal row.

Further, since reduced screens stored in the virtual frame memory 49 are displayed on the monitor apparatus 4, it is possible to change the array positions of the reduced screens stored in the virtual frame memory 49 by inputting a predetermined instruction from the cordless telephone set (child machine) 5 while observing the display of the reduced screens.

Accordingly, in this instance, the reduced screens can be arranged in accordance with the preference of the viewer. In other words, the array of the reduced screens can be customized.

Further, where the broadcasting station side transmits reduced screens in a condition arranged for individual categories of programs as described hereinabove with reference to FIG. 5, the reduced screens can be stored in the arranged condition into the virtual frame memory 49. However, even if the reduced screens are transmitted in such an arranged condition for individual program categories, the reduced screens may be re-arranged in accordance with a manner of arrangement desired by the viewer as described above.

It is to be noted that such a manner of arrangement (array order) as mentioned above can be set by manually operating the cordless telephone set (child machine) 5 based on a predetermined menu screen displayed on the monitor apparatus 4 in response to a manual operation of a predetermined key of the cordless telephone set (child machine) 5. The manner of arrangement thus set is, for example, stored into the EEPROM 38. When a manner of arrangement is set in the EEPROM 38, the CPU 29 designates to the demultiplexer 24 an array order which is used to store reduced screens into the virtual frame memory 49. Then, the demultiplexer 24 stores the reduced screens into the virtual frame memory 49 in accordance with the array order designated from the CPU 29.

Figure 14:
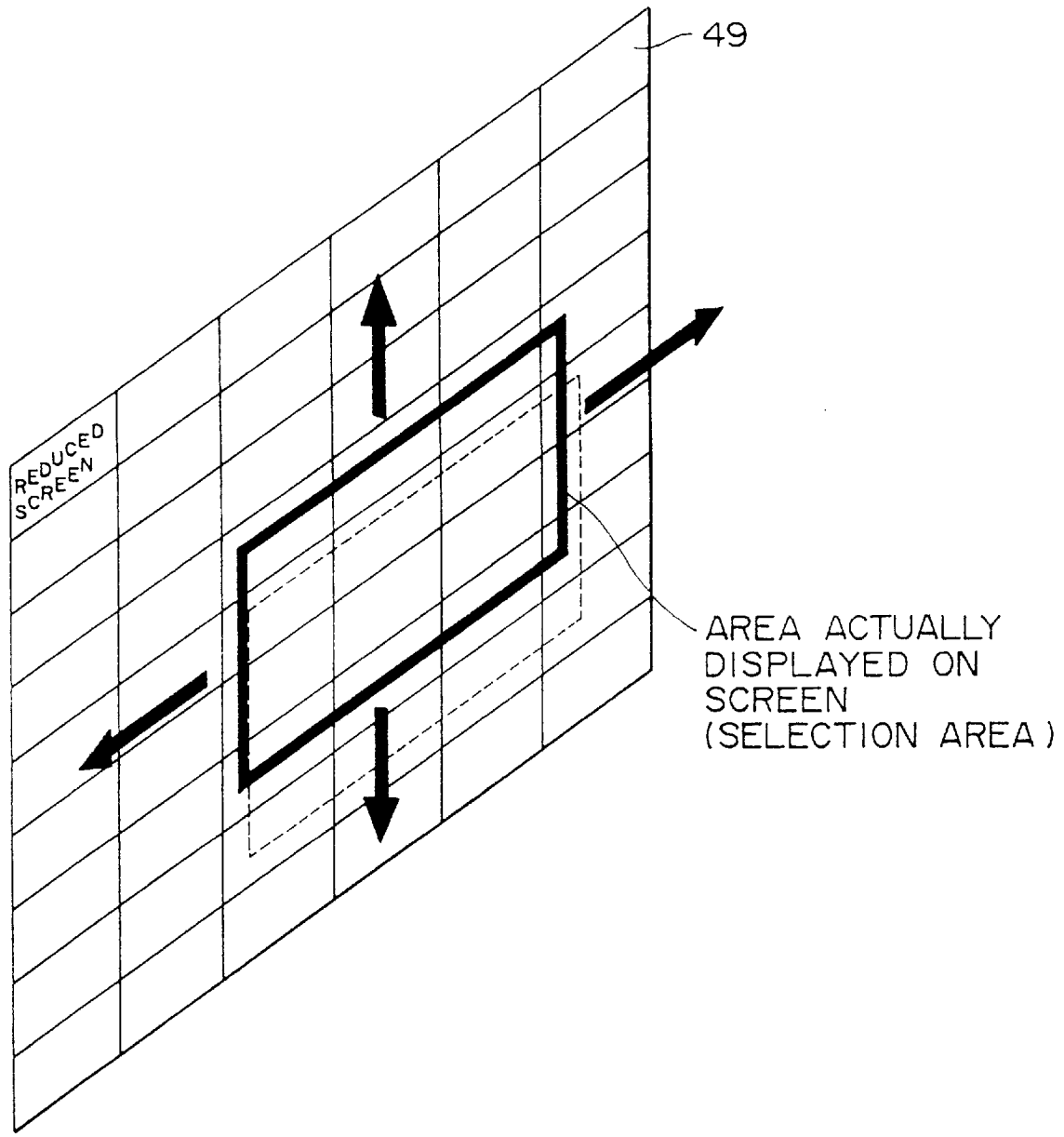
FIG. 14 is a schematic view illustrating a relationship between a virtual screen and a selection area.

After the reduced screens are stored into the virtual frame memory 49, those of the reduced screens which are included in a range (selection area) within which they can be displayed at a time on one screen of the monitor apparatus 4 are designated by the CPU 29. In particular, in the present embodiment, since one reduced screen corresponds to a screen of an ordinary program which is reduced to ⅓ in vertical and horizontal lengths thereof as described above, for example, such 3×3 reduced screens surrounded by a thick line in FIG. 14 are read out. Then, the 3×3 reduced screens are supplied from the receiver 2 to the monitor apparatus 4 and displayed as a multi-preview screen on the monitor apparatus 4 as seen in FIG. 15.

Here, when a predetermined range (selection area) of 3×3 reduced screens from among the reduced screens stored in the virtual frame memory 49 is displayed as described above, it can be considered that the screen of the monitor apparatus 4 is used as such a metaphor that the reduced screens on the virtual frame memory 49 are partially peeped.

Figure 15:
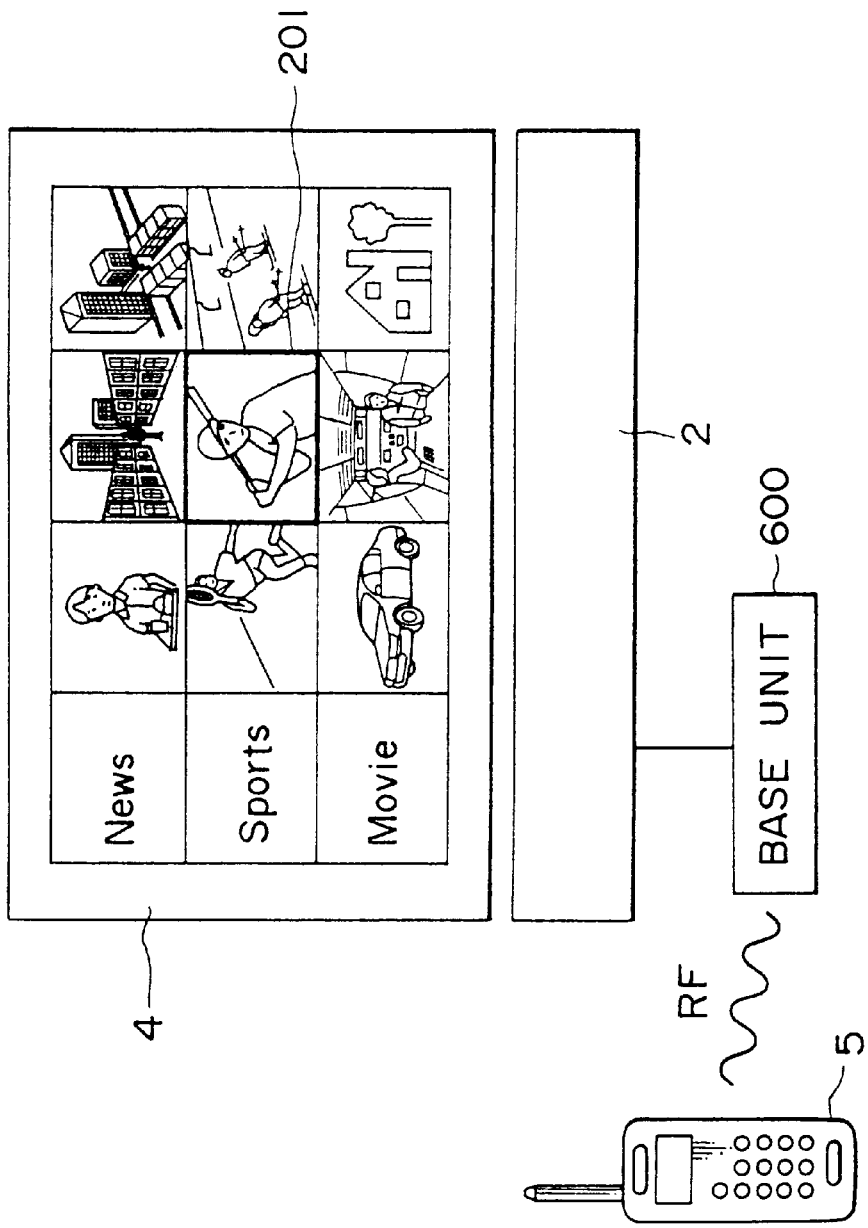
FIG. 15 is a schematic view showing program selection screens displayed on a monitor apparatus shown in FIG. 3.

Then, in this instance, the monitor apparatus 4 displays, together with 3×3 reduced pixels as a multi-preview screen, the cursor 201 in the form of a frame which surrounds a certain reduced screen as seen in, for example, in FIG. 15 in a superimposed condition by OSD display on the screen. It is to be noted that the cursor 201 is not limited to such a cursor in the form of a frame as described above, but may be any graphic form such as an arrow mark or the like only if it can be identified clearly for selection.

When the cursor 201 is positioned, for example, at a central one of 3×3 reduced screens, if the numeral 5 key (upward movement key) of the cordless telephone set (child machine) 5, the numeral 8 key (downward movement key), the numeral 4 key (leftward movement key) or the numeral 6 key (rightward movement key) is manually operated, then the cursor 201 is moved, in response to the direction of the operation, to a position surrounding a reduced screen displayed at the position upwardly, downwardly, leftwardly or rightwardly of the central reduced screen.

Here, if any of the keys mentioned above is further manually operated directionally while the cursor 201 remains positioned at the upper, lower, left or right end of the screen of the monitor apparatus 4, the contents of the display of the monitor apparatus 4, that is, the multi-preview screen, is scrolled. For example, if a downward directional operation is performed while the cursor 201 is positioned at the lowest row of the multi-preview screen, then the multi-preview screen is scrolled upwardly by one row distance.

This scrolling is performed such that, for example, in place of the 3×3 reduced screens surrounded by a thick line in FIG. 14, other 3×3 reduced screens surrounded by a dotted line in FIG. 14 are read out from the virtual frame memory 49 and supplied to the monitor apparatus 4. It is to be noted that, since the cursor 201 remains stopping at the lowermost row, the cursor 201 is relatively moved downwardly by one row distance in the virtual frame memory 49 shown in FIG. 13 (or 14).

Figure 16:
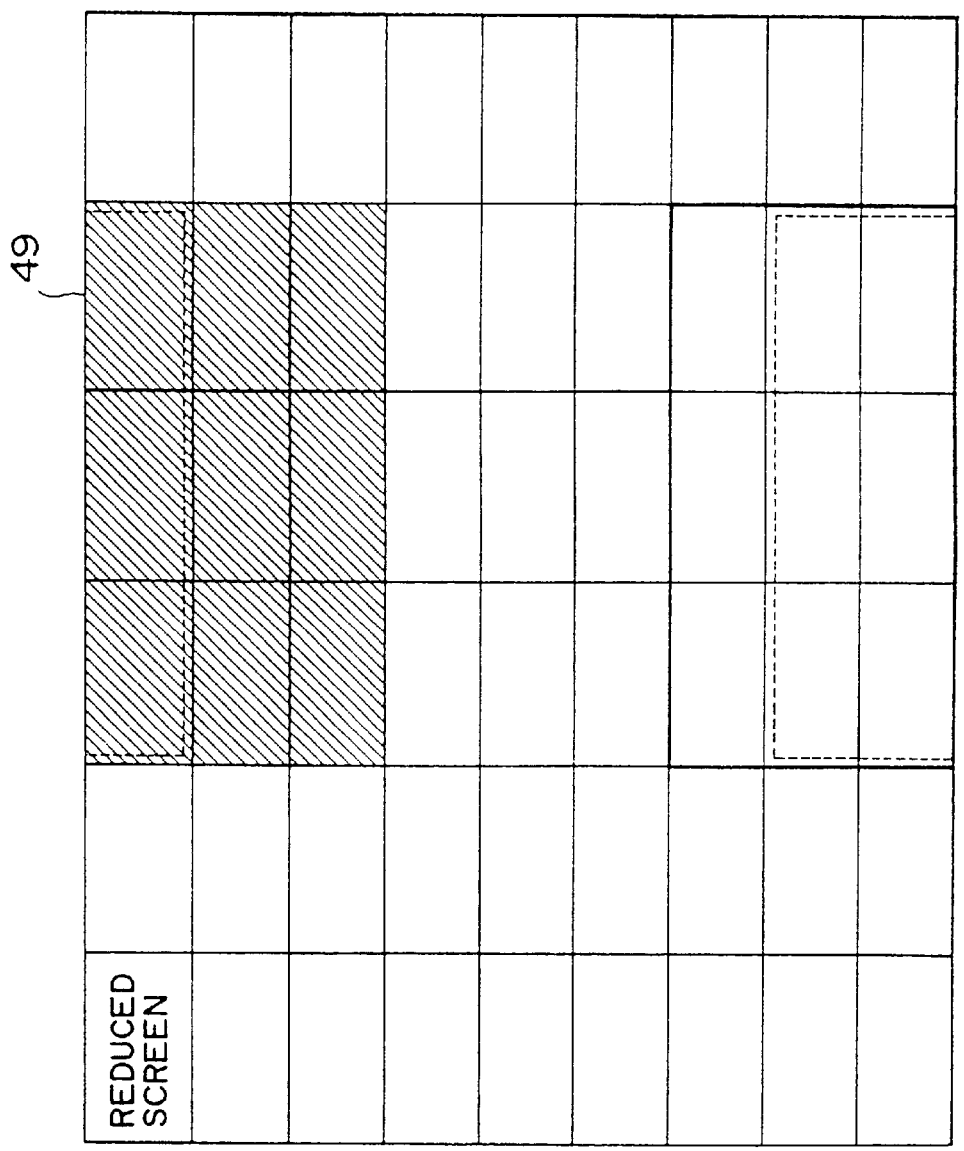
FIG. 16 is a schematic view illustrating scrolling of a selection area.

Further, when, for example, 3×3 reduced screens including reduced screens arranged in the lowermost row of the virtual frame memory 49 (3×3 reduced screens surrounded by a thick line in FIG. 16) are displayed on the monitor apparatus 4 while the cursor 201 remains at the lower end position of the screen of the monitor apparatus 4 as seen in FIG. 16, if a downward directional operation is performed, then the screen of the monitor apparatus 4 is scrolled. Consequently, 3×2 reduced screens in the lowermost row and the second lowermost row and 3×1 reduced screens in the uppermost row surrounded by dotted lines in FIG. 16 are displayed on the monitor apparatus 4.

Accordingly, when the 3×3 reduced screens surrounded by the thick line in FIG. 16 are displayed on the monitor apparatus 4 while the cursor 201 is at the lower end position of the screen of the monitor apparatus 4, if a downward directional operation is performed three times successively using the numeral 8 key, then 3×3 reduced screens including the reduced screens in the uppermost row and indicated by slanting lines in FIG. 16 are displayed.

Scrolling is performed in a similar manner with regard to the upward, leftward or rightward direction.

Such scrolling is performed as a signal (operation signal) corresponding to a directional operation of the numeral 2, 8, 4 or 6 key is received by the CPU 29 of the receiver 2 and the read address of the virtual frame memory 49 is controlled in response to the received operation signal by the CPU 29. In particular, the CPU 29 recognizes, based on the received operation signal, a range of reduced screens to be displayed on the monitor apparatus 4. Then, the CPU 29 delivers an instruction to the virtual frame memory 49 to read out the reduced screens in the thus recognized range. Consequently, the reduced screens (some reduced screens) within the instructed range are read out from the virtual frame memory 49 and outputted to the monitor apparatus 4. As a result, the screen of the monitor apparatus 4 is scrolled.

Accordingly, in this instance, the directional operation can be considered to be an operation for designating reduced screens to be read out from the virtual frame memory 49.

Since the multi-preview screen is scrolled as described above, even if the number of programs is greater than the number of programs of reduced screens which can be displayed at a time on the monitor apparatus 4, the multi-preview screen of all programs can be provided to the viewer.

While observing such reduced screens of full motion displayed on the monitor apparatus 4 as shown in FIG. 15, the viewer performs a directional operation to move the cursor 201 to a desired reduced screen. Then, if the numeral 5 key (YES key) is manually operated (selection operation) in order to settle selection of the television program while the cursor 201 is positioned at the desired reduced screen, the CPU 29 sends an instruction to the front end circuit 20 to receive the program of a channel linked to the selected reduced screen.

In response to the instruction, the tuner 21 of the front end circuit 20 is tuned to the transmission channel of the instructed program and outputs packet data of a plurality of programs included in the transmission channel to the demultiplexer 24. The demultiplexer 24 separates the packet of a predetermined program from within the packets of the plurality of programs in response to the instruction from the CPU 29 and outputs the separated packet to the MPEG video decoder 25-1 Decoded data from the MPEG video decoder 25-1 are processed by the NTSC encoder 27 and outputted to the monitor apparatus 4 via the succeeding blocks. The monitor apparatus 4 thus displays, in place of the multi-preview screen, an image of the program outputted from the receiver 2.

In short, the viewer can enjoy a desired program by moving the cursor 201 to a desired reduced screen and then performing a selection operation.

It is to be noted that sound is incidental to the multi-screen, and the demultiplexer 24 separates a packet of an audio signal corresponding to a reduced screen at which the cursor 201 is positioned (sound of a program corresponding to the reduced screen) and supplies the audio signal to the MPEG audio decoder 26 so that the audio signal may be decoded by the MPEG audio decoder 26. Consequently, the viewer can observe the reduced screen of full motion at which the cursor 201 is positioned and can listen to sound incidental to the reduced screen simultaneously on the real time basis.

Figure 17:
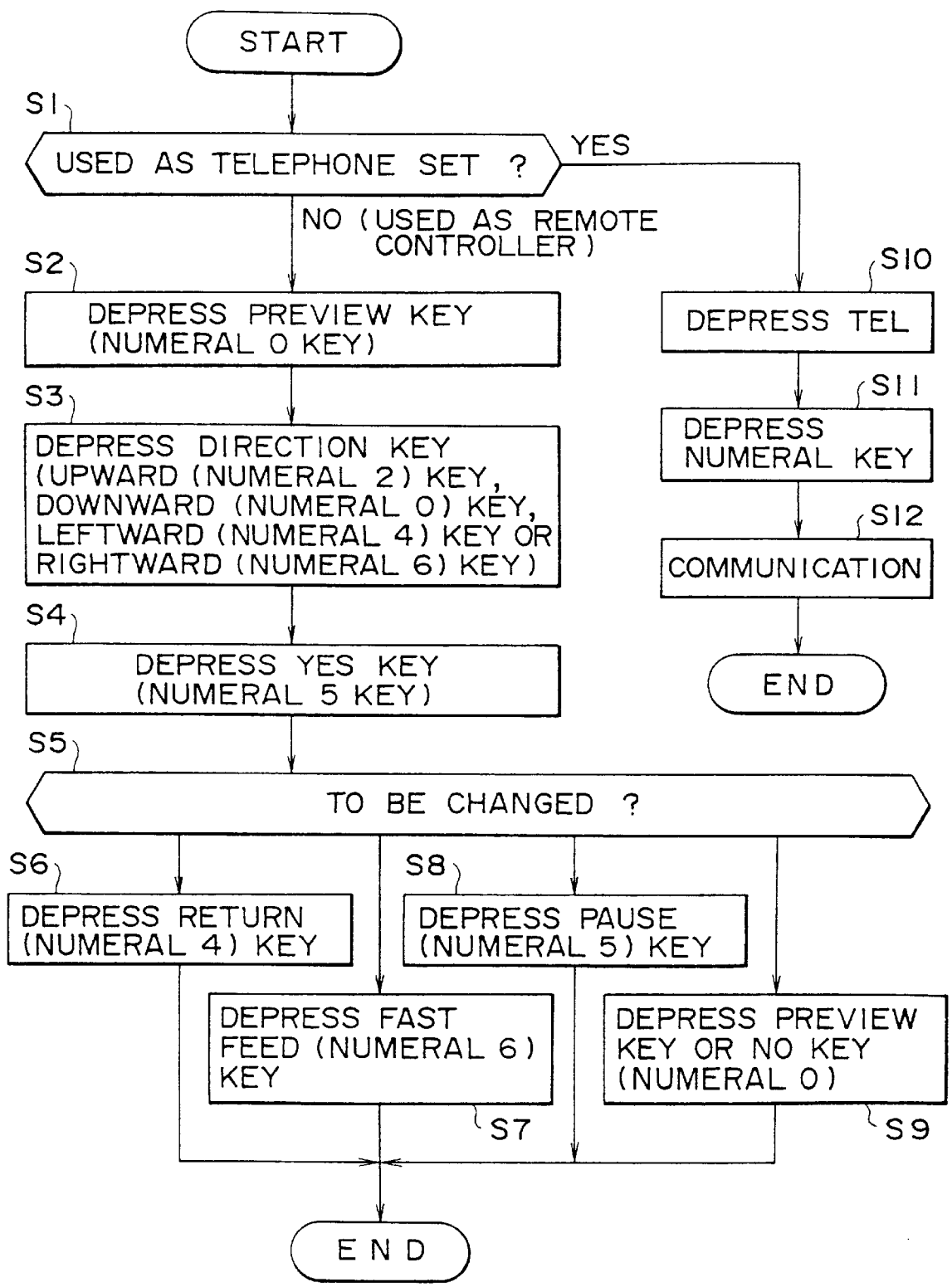
FIG. 17 is a flow chart illustrating operation of the cordless telephone set (child machine) of FIG. 9.

While operation for selecting a desired program from within a program selection screen is described above, a general manner of use of the child machine 5 is illustrated in FIG. 17.

Referring to FIG. 17, it is determined first at step S1 by a user whether the child machine 5 should be used as a telephone set or should used as a remote commander for remotely controlling the receiver 2 (monitor apparatus 4) as an electronic apparatus. Where the child machine 5 should be used as a remote commander, the control sequence advances to step S2, at which the preview button (numeral 0 key) is manually operated. In this instance, a DTMF signal corresponding to the numeral 0 is generated from the base unit 600 in response to a signal from the child machine 5 in such a manner as described above and is transmitted to the modem 632. The modem 632 decodes the DTMF signal and outputs a code corresponding to the numeral 0 to the CPU 29. The CPU 29 interprets a function allocated to the code of the numeral 0 and controls, in accordance with the interpretation, the tuner 21 to receive a program selection screen so as to be displayed.

Then, the control sequence advances to step S3, at which the user manually operates one of the four directional movement keys including the numeral 2, 8, 4 and 6 keys. Also when this operation is performed, a DTMF signal corresponding to the operated key is transmitted to the modem unit 631, and a code corresponding to the numeral 2, 8, 4 or 6 key is inputted from the modem 632 to the CPU 29. The CPU 29 interprets a function corresponding to the code and moves, in accordance with the interpretation, the cursor in a direction corresponding to the operated key.

After the cursor 201 is moved to the position of a desired program (reduced screen), the user manually operates the YES key (numeral 5 key) at step S4. Also in this instance, a DTMF signal corresponding to the numeral 5 is transmitted to the modem unit 631, and a code corresponding to the numeral 5 is inputted from the modem 632 to the CPU 29. The CPU 29 controls, in accordance with the interpretation, the tuner 21 to receive and display the designated program. Consequently, the program designated on the program selection screen is displayed in the full size on the monitor apparatus 4.

Thereafter, the control sequence advances to step S5, at which it is discriminated whether or not the displaying condition must be changed, and if the displaying condition must be changed, predetermined operations are performed at steps S6 to S9.

For example, when a video-on-demand program (screen of the full size) is displayed on the monitor apparatus 4, by manually operating the rewinding key (numeral 4 key), the fast feed key (numeral 6 key) or the pause key (numeral 5 key) at step S6, S7 or S8, the screen of the program being received currently can be returned or advanced in the reverse direction in time or can be put into a pause condition.

In particular, if any of the keys mentioned above is manually operated, then a corresponding DTMF signal is generated. Consequently, a DTMF signal corresponding to the numeral 4, 6 or 5 is transmitted to the modem unit 631, and a code corresponding to the numeral 4, 6 or 5 is inputted from the modem 632 to the CPU 29.

The CPU 29 interprets the code inputted thereto and controls the transmitter 622 to generate a signal requesting rewinding, fast feeding or pause corresponding to the operated key. The signal thus generated is supplied from the transmitter 622 to the video server 53 via the cable 611. Upon reception of the signal, the video server 53 changes the program to be transmitted to the receiver 2 via the cable 611 to a retrospective screen or a prospective screen at a high speed or to a screen of a still picture. In other words, a screen similar to that which is obtained when, while a VCR is in a reproduction condition, a magnetic tape is rewound or fed fast or is in a pause condition is transmitted. As a result, such a screen as described above is displayed on the monitor apparatus 4.

On the other hand, if it is desired to display a multi-screen (program selection screen) while an ordinary screen of the full size is displayed, then the preview button (numeral 0 key) is depressed at step S9. As a result, the tuner 21 is controlled again so that the program selection screen (multi-screen) is received and displayed on the display apparatus 4.

Also when it is tried to initially set various functions of the monitor apparatus 4 or to input a negation to a message displayed on the monitor apparatus 4, the numeral 0 key is used as the NO key. In order to input an affirmation, the numeral 5 key (YES key) is used.

Also when any of the keys mentioned above is depressed, the CPU 29 receives a signal corresponding to the input via the modem unit 631 and executes corresponding processing.

In contrast, when it is discriminated at step S1 that the child machine 5 is used as a telephone set, the control sequence advances to step S10, at which the TEL key is depressed first. When a DTMF signal corresponding to the TEL key is inputted as a result of processing similar to that described hereinabove, the external telephone off-hook detection circuit 634 detects an off-hook condition. In this instance, the modem 632 sets a telephone mode, in which it thereafter processes any numeral or symbol inputted as a DTMF signal as an input for a telephoning operation. Accordingly, in this instance, the modem 632 does not decode the DTMF signal inputted thereto.

Thus, the control sequence advances to step S11, at which the user depresses the numeral keys to input a telephone number. The microcomputer 684 of the child machine 5 controls the transmission circuit 682 to transmit a signal corresponding to each manually operated key to the base unit 600.

When an input of the signal is received via the reception circuit 654, the microcomputer 656 of the base unit 600 controls the DTMF encoder 652 to generate a DTMF signal corresponding to the manually operated numeral key. When the DTMF signal is inputted in a telephone mode of the telephone set, the modem 632 transmits the DTMF signal to a telephone line via the modular jack 635. Consequently, a line controlling operation is performed.

The modem 632 closes the telephone line when it detects from reversal of the polarity of the telephone line or the like that the other party has responded to the call originating operation.

As a result, received speech transmitted thereto from the other party via the telephone line is inputted to the base unit 600 via the external telephone off-hook detection circuit 634. The line interface 651 of the base unit 600 supplies the receives speech to the transmission circuit 653 so that it is transmitted to the child machine 5 via the antenna 655.

In the child machine 5, the received speech is received by the reception circuit 683 via the antenna 681 and outputted from the loudspeaker 702.

On the other hand, transmission speech inputted from the microphone 703 is transmitted from the transmission circuit 682 to the base unit 600 via the antenna 681.

In the base unit 600, the transmission speech is received by the reception circuit 654 via the antenna 655 and is outputted via the line interface 651. The transmission speech is transmitted to the telephone line via the external telephone off-hook detection circuit 634. Communication processing at step S12 is performed in this manner.

When a call signal is inputted from the other party via the telephone line, the call signal is inputted to the base unit 600. When the call signal is inputted via the line interface 651, the reception circuit 654 detects this and outputs a detection signal to the microcomputer 656.

In this instance, the microcomputer 656 controls the transmission circuit 653 to generate a ringer sound signal so as to be outputted from a loudspeaker not shown. The ringer sound signal is also transmitted from the transmission circuit 653 to the child machine 5 via the antenna 655. In the child machine 5, the ringer sound signal is received by the reception circuit 683 and outputted from the loudspeaker 702. Consequently, the user can become aware of the terminating call.

It is to be noted that a predetermined setting may be performed to prevent ringer sound from being outputted from the child machine 5.

When to respond to the terminating call, the user manually operates the TEL key. In this instance, the microcomputer 684 controls the transmission circuit 682 to generate a response signal.

When an input of a detection signal of the response signal is received from the reception circuit 654, the microcomputer 656 of the base unit 600 controls the reception circuit 654 to generate an off-hook signal. The off-hook signal is transmitted via the line interface 651 to and detected by the external telephone off-hook detection circuit 634 of the modem unit 631. When the off-hook signal is detected, the modem 632 closes the telephone line. Consequently, subsequent communication is permitted.

Figure 18:
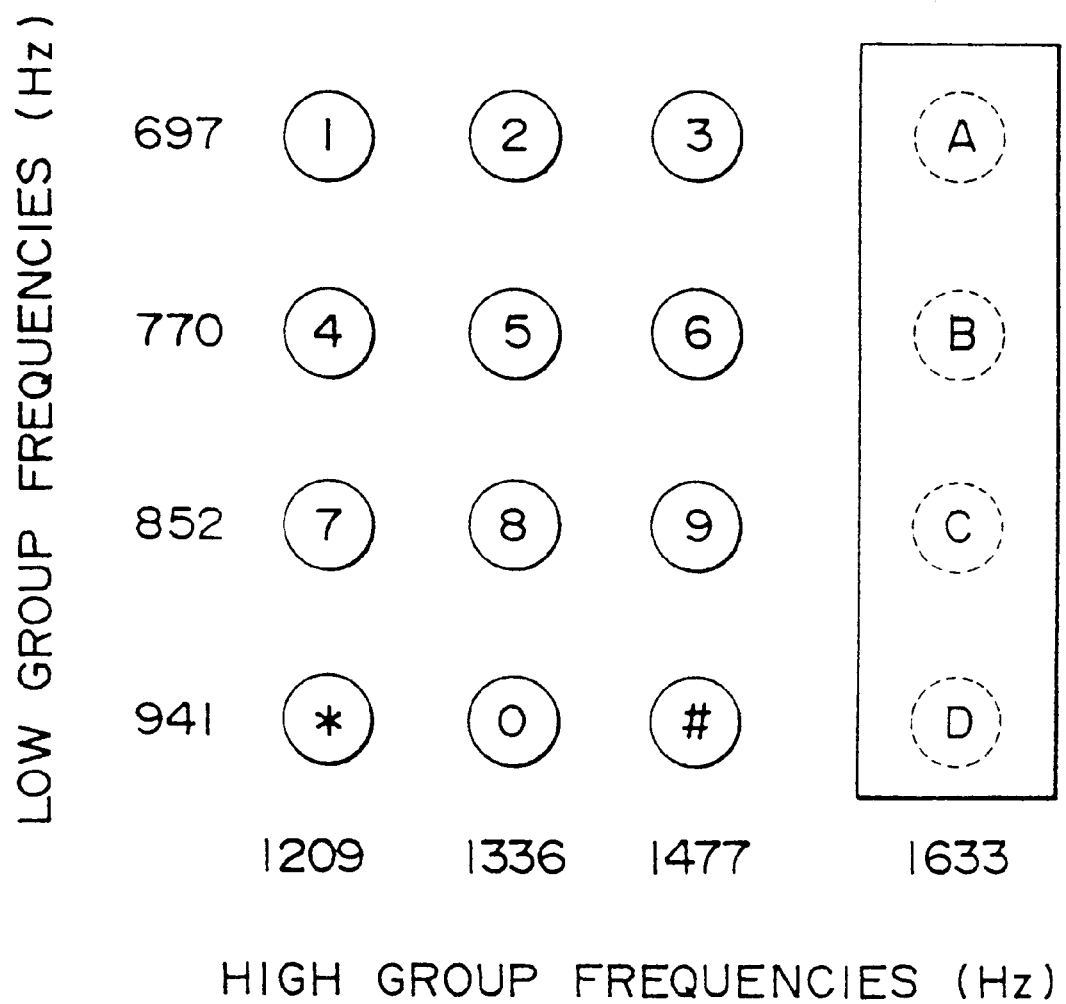
FIG. 18 is a schematic view illustrating a DTMF signal.

FIG. 18 illustrates a construction of a DTMF signal. As seen in FIG. 18, in the DTMF (Dual Tone Multi Frequency) signal, a mixed signal of two frequencies of a low group frequency and a high group frequency is allocated to each key. As seen in FIG. 18, the low group frequency is one of 697 Hz, 770 Hz, 852 Hz and 941 Hz while the high group frequency is one of 1,209 Hz, 1,336 Hz, 1,477 Hz and 1,633 Hz. Those frequencies are allocated to the individual keys.

For example, to the numeral 1 key, the low group frequency of 697 Hz and the high group frequency of 1,209 Hz are allocated. To the numeral 2 key, the low group frequency of 697 Hz and the high group frequency of 1,336 Hz are allocated.

It is to be noted that, to the TEL key shown in FIG. 9, the low group frequency of 697 Hz and the high group frequency of 1,633 Hz at a position indicated by character A in FIG. 18 are allocated.

Accordingly, for example, if the numeral 1 key is manually operated, the DTMF encoder 652 outputs a mixed signal of signals of the two different frequencies of 697 Hz and 1,209 Hz as a DTMF signal. On the other hand, when the numeral 2 key is manually operated, a mixed signal of a signal of the frequency of 697 Hz and another signal of the frequency of 1,336 Hz is generated as a DTMF signal.

When the DTMF signal is received, the DTMF decoder 633 generates a-code corresponding to the numeral or symbol. For example, when a DTMF signal of the frequencies of 697 Hz and 1,336 Hz is detected, the DTMF decoder 633 outputs a code of the numeral 2.

In order to notify an operation signal of a key from the telephone set (base unit 600) to the receiver 2, any signal other than a DTMF signal may be used. However, where some other signal is used, a detection circuit for the exclusive use for the signal must be provided in the receiver 2, which results in increase in cost. Since the modem 632 originally includes a built-in DTMF decoder for the interface with a telephone line, where the DTMF decoder is utilized as it is as in the present embodiment, the construction can be simplified and the cost can be reduced.

While, in the foregoing description, a DTMF signal generated by the base unit 600 is utilized, where the child machine 5 includes a built-in DTMF encoder, a DTMF signal generated by the child machine 5 may be utilized instead.

Further, while, in the foregoing description, a signal is sent out from the receiver to the video server 53 via the cable 611, it may otherwise be sent out via a telephone line. In this instance, a modem should be built in the modem unit 631.

It is to be noted that, while, in the present embodiment, 3×3 reduced screens are displayed at a time on the monitor apparatus 4 in order to allow selection of a program, the number of reduced screens to be displayed at a time on the monitor apparatus 4 is not limited to the specific number. In particular, for example, 4×4 reduced screens or 3×2 reduced screens can be displayed at a time on the monitor apparatus 4 based on, for example, the resolution of the monitor apparatus 4 or some other parameter (however, the size of one reduced screen must be even at the smallest such that, when observing the reduced screen, the viewer can understand contents of the program).

Further, while, in the present embodiment, reduced screens are arranged in a matrix on the virtual frame memory 49, it is otherwise possible, for example, to store reduced screens into a predetermined storage area and store addresses, at which the reduced screens are stored, in a matrix in the virtual frame memory 49. In this instance, an address stored in the virtual frame memory 49 may be referred to read out a reduced screen stored at the address and display the reduced screen. Further, also the processing of customizing and arranging reduced screens for individual categories may be modified such that, without changing the arrangement on the virtual frame memory 49, reduced screens only of a predetermined category are read out and displayed as a multi-preview screen.

Further, while the receiver 2 and the monitor apparatus 4 in the present embodiment are constructed as independent apparatus of each other, the receiver 2 and the monitor apparatus 4 may otherwise be formed as a unitary member.

Further, while, in the present embodiment, reduced screens are arranged, upon arrangement for individual categories, such that reduced screens of the same category are arranged in a horizontal row (horizontal direction), reduced screens of the same category may otherwise be arranged in a vertical column (vertical direction).

Further, while, in the present embodiment, data for program selection to be transmitted are reduced screens of moving pictures obtained by reduction of screens of ordinary programs, still pictures or text data representative of contents of programs may alternatively be used as the data for program selection.

Further, while, in the present embodiment, data for program selection are transmitted, such data for program selection may alternatively be produced, for example, on the viewer side. In particular, it is possible to produce, on the viewer side, reduced screens or some other data representative of contents of programs from ordinary programs received and use them as data for program selection.

Further, while, in the present embodiment, the screen is scrolled so that all data for program selection may be observed, it is otherwise possible to change over the screen, for example, in a page turning manner so that all data for program selection may be observed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalence of the claims are therefore intended to be embraced therein.

What is claimed is:

1. An electronic apparatus to which a program selection apparatus using a cordless telephone set is applied, comprising:

reception means for receiving a signal from said cordless telephone set;

control means for performing a line controlling operation when a first DTMF signal from said cordless telephone set is received by said reception means in a first mode of said electronic apparatus;

means for reducing screens of a plurality of programs forming a plurality of reduced screens;

output means for outputting a signal of a program selection screen in which the plurality of reduced screens are arranged when a second DTMF signal from said cordless telephone set is received by said reception means in a second mode of said electronic apparatus.

2. An electronic apparatus to which a program selection apparatus using a cordless telephone set is applied, comprising:

means for reducing screens of a plurality of programs forming a plurality of reduced screens;

output means for outputting a signal of a program selection screen in which the plurality of reduced screens are arranged;

reception means for receiving a signal from said cordless telephone set;

control means for performing a line controlling operation when a first DTMF signal from said cordless telephone set is received by said reception means in a first mode of said electronic apparatus; and movement means for moving a cursor arranged on said program selection screen when a second DTMF signal from said cordless telephone set is received by said reception means in a second mode of said electronic apparatus.

3. An electronic apparatus to which a program selection apparatus using a cordless telephone set is applied according to claim 2, further comprising selection means for selecting a program of one of the plurality of reduced screens at which said cursor is positioned when a third DTMF signal from said cordless telephone set is received by said reception means in the second mode of said electronic apparatus.

4. A program selection method using a cordless telephone set, comprising the steps of:

receiving a signal from said cordless telephone set;

performing a line controlling operation when a first DTMF signal is received from said cordless telephone set in a first mode;

reducing screens of a plurality of programs; and outputting a signal of a program selection screen in which a plurality of the reduced screens are arranged when a second DTMF signal from said cordless telephone set is received in a second mode.

5. A program selection method using a cordless telephone set, comprising the steps of:

reducing screens of a plurality of programs and forming a plurality of reduced screens;

arranging a cursor at a position of one of a plurality of child screens of a program selection screen in which a plurality of the reduced screens are arranged;

receiving a signal from said cordless telephone set;

performing a line controlling operation when a first DTMF signal is received from said cordless telephone set in a first mode; and moving said cursor when a second DTMF signal is received from said cordless telephone set in a second mode.

* * * * *